(12) United States Patent
Brown et al.

(10) Patent No.: US 8,392,461 B2
(45) Date of Patent: Mar. 5, 2013

(54) VIRTUAL DATA MAINTENANCE

(75) Inventors: Douglas Brown, Rancho Santa Fe, CA (US); John Mark Morris, San Diego, CA (US); Todd Walter, Poway, CA (US)

(73) Assignee: Teradota US, Inc., Dayton, OH (US)

( * ) Notice: Subject to any disclaimer, the term of this patent is extended or adjusted under 35 U.S.C. 154(b) by 526 days.

(21) Appl. No.: 11/985,909

(22) Filed: Nov. 19, 2007

(65) Prior Publication Data
US 2009/0132602 A1   May 21, 2009

(51) Int. Cl.
*G06F 17/30* (2006.01)
*G06F 17/00* (2006.01)
(52) U.S. Cl. .................. 707/792; 707/786; 707/797
(58) Field of Classification Search .................. 707/688, 707/694, 786, 792–797
See application file for complete search history.

(56) References Cited

U.S. PATENT DOCUMENTS

| | | | | |
|---|---|---|---|---|
| 6,078,955 | A * | 6/2000 | Konno et al. | 709/224 |
| 6,523,027 | B1 * | 2/2003 | Underwood | 1/1 |
| 6,564,221 | B1 * | 5/2003 | Shatdal | 707/102 |
| 6,615,222 | B2 * | 9/2003 | Hornibrook et al. | 1/1 |
| 6,728,720 | B1 * | 4/2004 | Lenzie | 1/1 |
| 7,111,300 | B1 * | 9/2006 | Salas et al. | 718/105 |
| 7,302,450 | B2 * | 11/2007 | Benedetti et al. | 707/104.1 |
| 7,849,114 | B2 * | 12/2010 | Boss et al. | 707/831 |
| 2002/0152305 | A1 * | 10/2002 | Jackson et al. | 709/224 |
| 2002/0198863 | A1 * | 12/2002 | Anjur et al. | 707/1 |
| 2003/0093408 | A1 * | 5/2003 | Brown et al. | 707/2 |
| 2004/0181522 | A1 * | 9/2004 | Jardin | 707/3 |
| 2004/0205110 | A1 * | 10/2004 | Hinshaw | 709/201 |
| 2005/0086195 | A1 * | 4/2005 | Tan et al. | 707/1 |
| 2006/0026179 | A1 * | 2/2006 | Brown et al. | 707/100 |

OTHER PUBLICATIONS

Zhong Tang, J. Douglas Birdwell, John Chiasson, Chaouki T. Abdallah, and Majeed M. Hayat "Closed Loop Control of a Load Balancing Network with Time Delays and Processor Resource Constraints" Advances in Communication Control Networks, LNCIS 308, pp. 245-268, 2004.*

Denise Ecklund, Vera Goebel, Thomas Plagemann, Earl F. Ecklund Jr., Carsten Griwodz, Jan Øyvind Aagedal, Ketil Lund, Arne-Jørgen Berre "QoS Management Middleware: A Separable, Reusable Solution", Springer-Verlag Berlin Heidelberg 2001.*

Richard Quintero, A.J. Barbera "A Real• Time Control System Methodology for Developing Intelligent Control Systems",National Institute of Standards and Technology, 1992.*

* cited by examiner

*Primary Examiner* — Neveen Abel Jalil
*Assistant Examiner* — Polina Peach
(74) *Attorney, Agent, or Firm* — Gates & Cooper LLP

(57) ABSTRACT

A computer-implemented apparatus, method, and article of manufacture manage a plurality of database systems and perform data maintenance tasks in a data warehouse system. A domain includes a plurality of database systems. A virtual regulator manages the domain, detects a request to invoke a data maintenance task on a first system in the domain, routes the data maintenance task, for execution, to a second system in the domain, and applies results from the data maintenance task (executed by the second system) to the first system.

25 Claims, 13 Drawing Sheets

ADMINISTRATOR

WORKLOAD QUERY
(DELAY) MANAGER

VIRTUAL DATA MAINTENANCE

CROSS-REFERENCE TO RELATED APPLICATIONS

This application is related to the following co-pending and commonly-assigned applications:

U.S. Utility patent application Ser. No. 10/730,348, filed Dec. 8, 2003, by Douglas P. Brown, Anita Richards, Bhashyam Ramesh, Caroline M. Ballinger and Richard D. Glick, and entitled Administering the Workload of a Database System Using Feedback;

U.S. Utility patent application Ser. No. 10/786,448, filed Feb. 25, 2004, by Douglas P. Brown, Bhashyam Ramesh and Anita Richards, and entitled Guiding the Development of Workload Group Definition Classifications;

U.S. Utility patent application Ser. No. 10/889,796, filed Jul. 13, 2004, by Douglas P. Brown, Anita Richards, and Bhashyam Ramesh, and entitled Administering Workload Groups;

U.S. Utility patent application Ser. No. 10/915,609, filed Aug. 10, 2004, by Douglas P. Brown, Anita Richards, and Bhashyam Ramesh, and entitled Regulating the Workload of a Database System;

U.S. Utility patent application Ser. No. 11/468,107, filed Aug. 29, 2006, by Douglas P. Brown and Anita Richards, and entitled A System and Method for Managing a Plurality of Database Systems, which applications claims the benefit of U.S. Provisional Patent Application Ser. No. 60/715,815, filed Sep. 9, 2005, by Douglas P. Brown and Anita Richards, and entitled A System and Method for Managing a Plurality of Database Systems;

U.S. Provisional Patent Application Ser. No. 60/877,977, filed on Dec. 29, 2006, by Douglas P. Brown and Anita Richards, and entitled Managing Events in a Computing Environment;

U.S. Utility patent application Ser. No. 11/716,889, filed on Mar. 12, 2007, by Douglas P. Brown, Anita Richards, Mark Morris and Todd A. Walter, and entitled Virtual Regulator for Multi-Database Systems, which application claims the benefit of U.S. Provisional Patent Application Nos. 60/877,766, 60/877,767, 60/877,768, and 60/877,823, all of which were filed Dec. 29, 2006;

U.S. Utility patent application Ser. No. 11/716,892, filed on Mar. 12, 2007, by Douglas P. Brown, Scott Gnau and Mark Morris, and entitled Parallel Virtual Optimization, which application claims the benefit of U.S. Provisional Patent Application Nos. 60/877,766, 60/877,767, 60/877,768, and 60/877,823, all of which were filed Dec. 29, 2006;

U.S. Utility patent application Ser. No. 11/716,880, filed on Mar. 12, 2007, by Mark Morris, Anita Richards and Douglas P. Brown, and entitled Workload Priority Influenced Data Temperature, which application claims the benefit of U.S. Provisional Patent Application Nos. 60/877,766, 60/877,767, 60/877,768, and 60/877,823, all of which were filed Dec. 29, 2006;

U.S. Utility patent application Ser. No. 11/716,890, filed on Mar. 12, 2007, by Mark Morris, Anita Richards and Douglas P. Brown, and entitled Automated Block Size Management for Database Objects, which application claims the benefit of U.S. Provisional Patent Application Nos. 60/877,766, 60/877,767, 60/877,768, and 60/877,823, all of which were filed Dec. 29, 2006;

U.S. Utility patent application Ser. No. 11/803,248, filed on May 14, 2007, by Anita Richards and Douglas P. Brown, and entitled State Matrix for Workload Management Simplification;

U.S. Utility patent application Ser. No. 11/811,496, filed on Jun. 11, 2007, by Anita Richards and Douglas P. Brown, and entitled Arrival Rate Throttles for Workload Management;

U.S. Utility patent application Ser. No. 11/891,919, filed on Aug. 14, 2007, by Douglas P. Brown, Pekka Kostamaa, Mark Morris, Bhashyam Ramesh, and Anita Richards, and entitled Dynamic Query Optimization Between Systems Based on System Conditions;

U.S. Utility patent application Ser. No. 11/985,910, filed on the same date herewith, by Douglas P. Brown, Scott E. Gnau, John Mark Morris and William P. Ward, and entitled Dynamic Query and Step Routing Between Systems Tuned for Different Objectives;

U.S. Utility patent application Ser. No. 11/985,994, filed on the same date herewith, by Douglas P. Brown and Debra A. Galeazzi, and entitled Closed-Loop System Management Method and Process Capable of Managing Workloads in a Multi-System Database;

U.S. Utility patent application Ser. No. 11/985,911, filed on the same date herewith, by Douglas P. Brown, Todd A. Walter, Anita Richards, and Debra A. Galeazzi, and entitled Dynamic Control and Regulation of Critical Database Resources Using a Virtual Memory Table Interface;

all of which applications are incorporated by reference herein.

BACKGROUND

Modern computing systems execute a variety of requests concurrently and operate in a dynamic environment of cooperative systems, each comprising of numerous hardware components subject to failure or degradation.

The need to regulate concurrent hardware and software "events" has led to the development of a field which may be generically termed "Workload Management." For the purposes of this application, "events" comprise, but are not limited to, one or more signals, semaphores, periods of time, hardware, software, business requirements, etc.

Workload management techniques focus on managing or regulating a multitude of individual yet concurrent requests in a computing system by effectively controlling resource usage within the computing system. Resources may include any component of the computing system, such as CPU (central processing unit) usage, hard disk or other storage means usage, or I/O (input/output) usage.

Workload management techniques fall short of implementing a full system regulation, as they do not manage unforeseen impacts, such as unplanned situations (e.g., a request volume surge, the exhaustion of shared resources, or external conditions like component outages) or even planned situations (e.g., systems maintenance or data load).

Many different types of system conditions or events can impact negatively the performance of requests currently executing on a computer system. These events can remain undetected for a prolonged period of time, causing a compounding negative effect on requests executing during that interval. When problematic events are detected, sometimes in an ad hoc and manual fashion, the computing system administrator may still not be able to take an appropriate course of action, and may either delay corrective action, act incorrectly or not act at all.

A typical impact of not managing for system conditions is to deliver inconsistent response times to users. For example, often systems execute in an environment of very cyclical usage over the course of any day, week, or other business cycle. If a user ran a report near standalone on a Wednesday afternoon, she may expect that same performance with many concurrent users on a Monday morning. However, based on the laws of linear systems performance, a request simply cannot deliver the same response time when running stand-alone as when it runs competing with high volumes of concurrency.

Therefore, while rule-based workload management can be effective in a controlled environment without external impacts, it fails to respond effectively when those external impacts are present.

An additional impact on the performance of requests in a computer system is based on the limited resources available in a computer system and the ability to perform data maintenance using such limited resources. Data maintenance tasks in a database system are typically competitors for limited resources and often are overlooked. Typically, these tasks run in the background or are relegated to a low system priority. However, in some cases, performing these data maintenance tasks may actually free up more resources than they consume. For example, this is true in the case of gathering up-to-date statistics, which may lead to more efficient optimizer plans. In other examples, data maintenance tasks may provide other rewards in terms of space savings, compaction, data integrity, etc. Therefore, what is needed is the ability to perform data maintenance tasks and thereby improve/increase the availability of system resources or processing capability.

SUMMARY

A computer-implemented method, apparatus, and article of manufacture provide the ability to perform data maintenance tasks in a data warehouse system. A domain contains a plurality of database systems. A virtual regulator manages the domain and vectors/routes the data maintenance tasks to a desired database system.

The virtual regulator detects a request to invoke a data maintenance task on a first system of the plurality of database systems. The virtual regulator then routes the data maintenance task to a second different system for execution. Lastly, the virtual regulator applies results (from the data maintenance task executed by the second different system) to the first system.

A variety of data maintenance tasks/operations may be provided. For example, statistics or demographics may be collected. Such statistics may be maintained on a per access module processor (AMP) basis and the number of AMPs in each system may be identical. Alternatively, through export of a hash map, the statistics can be maintained on a per access module processor (AMP) basis with a different number of AMPs in each system. Other data maintenance tasks may include space accounting, compression analysis wherein data is examined for frequency of use of each value in each column domain (with the results applied by instantiating value compression on the first system), integrity checking of the data, index analysis to identify opportunities for improved indexes for a workload, and statistics analysis to identify opportunities for improved statistics collection.

Other features and advantages will become apparent from the description and claims that follow.

DETAILED DESCRIPTION

Figure 1:
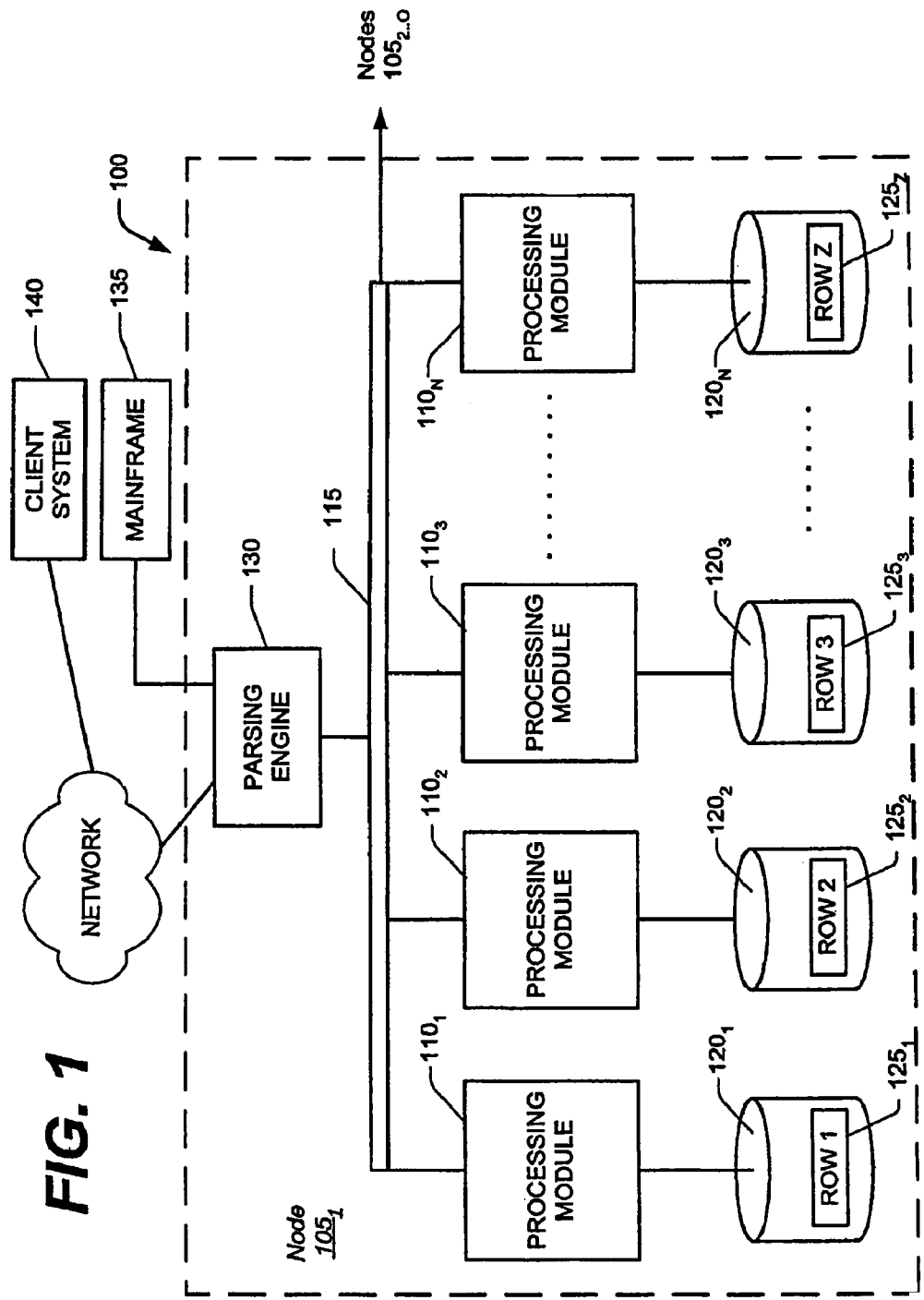
FIG. 1 is a block diagram of a node of a database system.

The event management technique disclosed herein has particular application to large databases that might contain many millions or billions of records managed by a database system ("DBS") 100, such as a Teradata Active Data Warehouse (ADW) available from NCR Corporation. FIG. 1 shows a sample architecture for one node $105_1$ of the DBS 100. The DBS node $105_1$ includes one or more processing modules $110_{1...N}$, connected by a network 115 that manage the storage and retrieval of data in data storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors. Each virtual processor is generally termed an Access Module Processor (AMP) in the Teradata Active Data Warehousing System.

For the case in which N virtual processors are running on an M processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data storage facilities $120_{1...N}$. Each of the data storage facilities $120_{1...N}$ includes one or more disk drives. The DBS 100 may include multiple nodes $105_{2...N}$ in addition to the illustrated node $105_1$, connected by extending the network 115.

The system stores data in one or more tables in the data storage facilities $120_{1...N}$. The rows $125_{1...Z}$ of the tables are stored across multiple data storage facilities $120_{1...N}$ to ensure that the system workload is distributed evenly across the processing modules $110_{1...N}$. A Parsing Engine (PE) 130 organizes the storage of data and the distribution of table rows $125_{1...Z}$ among the processing modules $110_{1...N}$. The PE 130 also coordinates the retrieval of data from the data storage facilities $120_{1...N}$ in response to queries received from a user at a mainframe 135 or a client computer 140. The DBS 100 usually receives queries in a standard format, such as SQL.

Figure 2:
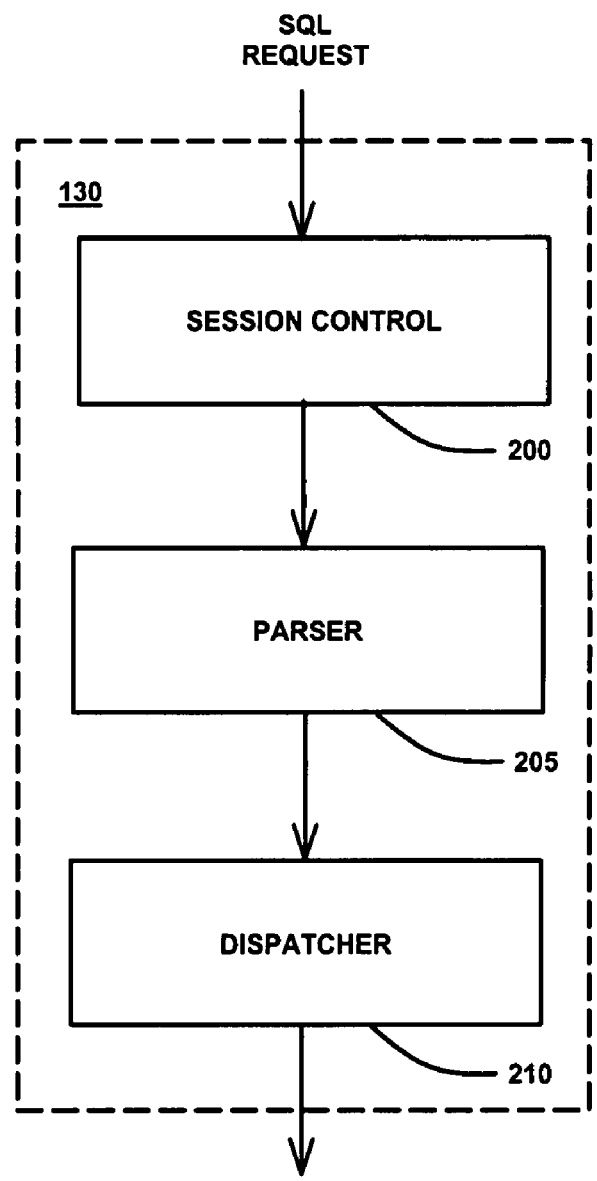
FIG. 2 is a block diagram of a parsing engine.

In one example system, the PE 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
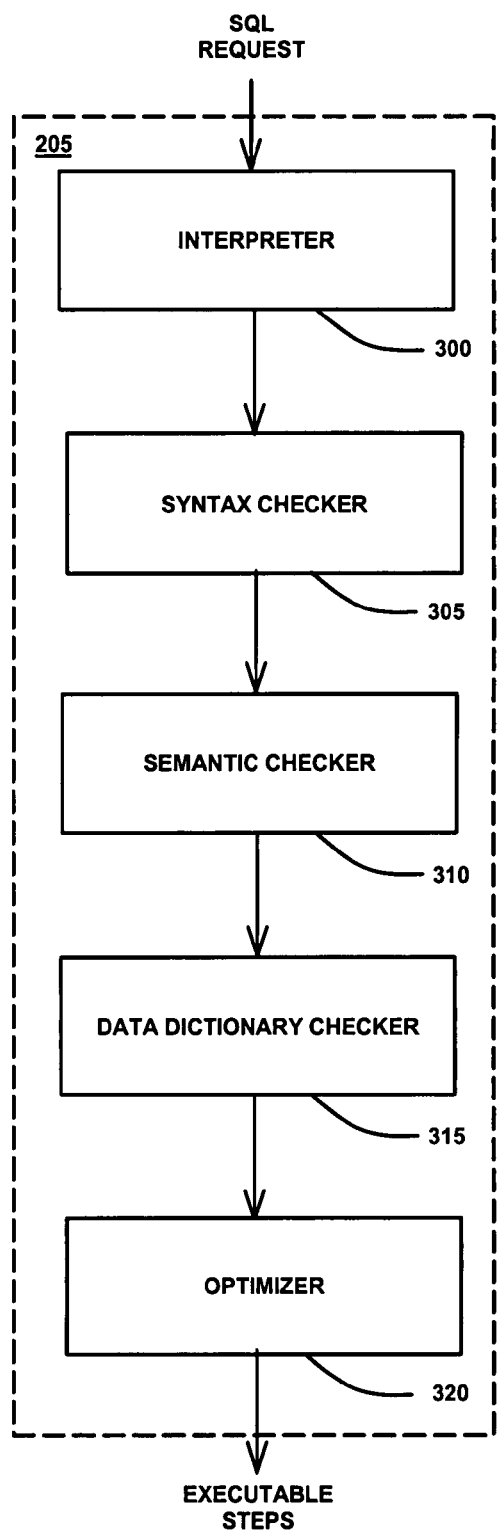
FIG. 3 is a flow chart of a parser.

Once the session control 200 allows a session to begin, a user may submit a SQL request that is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320) that develops the least expensive plan to perform the request.

The DBS 100 described herein accepts performance goals for each workload as inputs, and dynamically adjusts its own performance, such as by allocating DBS 100 resources and throttling back incoming work. In one example system, the performance parameters are called priority scheduler parameters. When the priority scheduler is adjusted, weights assigned to resource partitions and allocation groups are changed. Adjusting how these weights are assigned modifies the way access to the CPU, disk and memory is allocated among requests. Given performance objectives for each workload and the fact that the workloads may interfere with each other's performance through competition for shared resources, the DBS 100 may find a performance setting that achieves one workload's goal but makes it difficult to achieve another workload's goal.

The performance goals for each workload will vary widely as well, and may or may not be related to their resource demands. For example, two workloads that execute the same application and DBS 100 code could have differing performance goals simply because they were submitted from different departments in an organization. Conversely, even though two workloads have similar performance objectives, they may have very different resource demands.

The system includes a "closed-loop" workload management architecture capable of satisfying a set of workload-specific goals. In other words, the system is a goal-oriented workload management system capable of supporting complex workloads and capable of self-adjusting to various types of workloads. In Teradata, the workload management system is generally referred to as Teradata Active System Management (TASM).

The system's operation has four major phases: 1) assigning a set of incoming request characteristics to workload groups, assigning the workload groups to priority classes, and assigning goals (called Service Level Goals or SLGS) to the workload groups; 2) monitoring the execution of the workload groups against their goals; 3) regulating (adjusting and managing) the workload flow and priorities to achieve the SLGs; and 4) correlating the results of the workload and taking action to improve performance. The performance improvement can be accomplished in several ways: 1) through performance tuning recommendations such as the creation or change in index definitions or other supplements to table data, or to recollect statistics, or other performance tuning actions, 2) through capacity planning recommendations, for example increasing system power, 3) through utilization of results to enable optimizer self-learning, and 4) through recommending adjustments to SLGs of one workload to better complement the SLGs of another workload that it might be impacting. All recommendations can either be enacted automatically, or after "consultation" with the database administrator (DBA).

Figure 4:
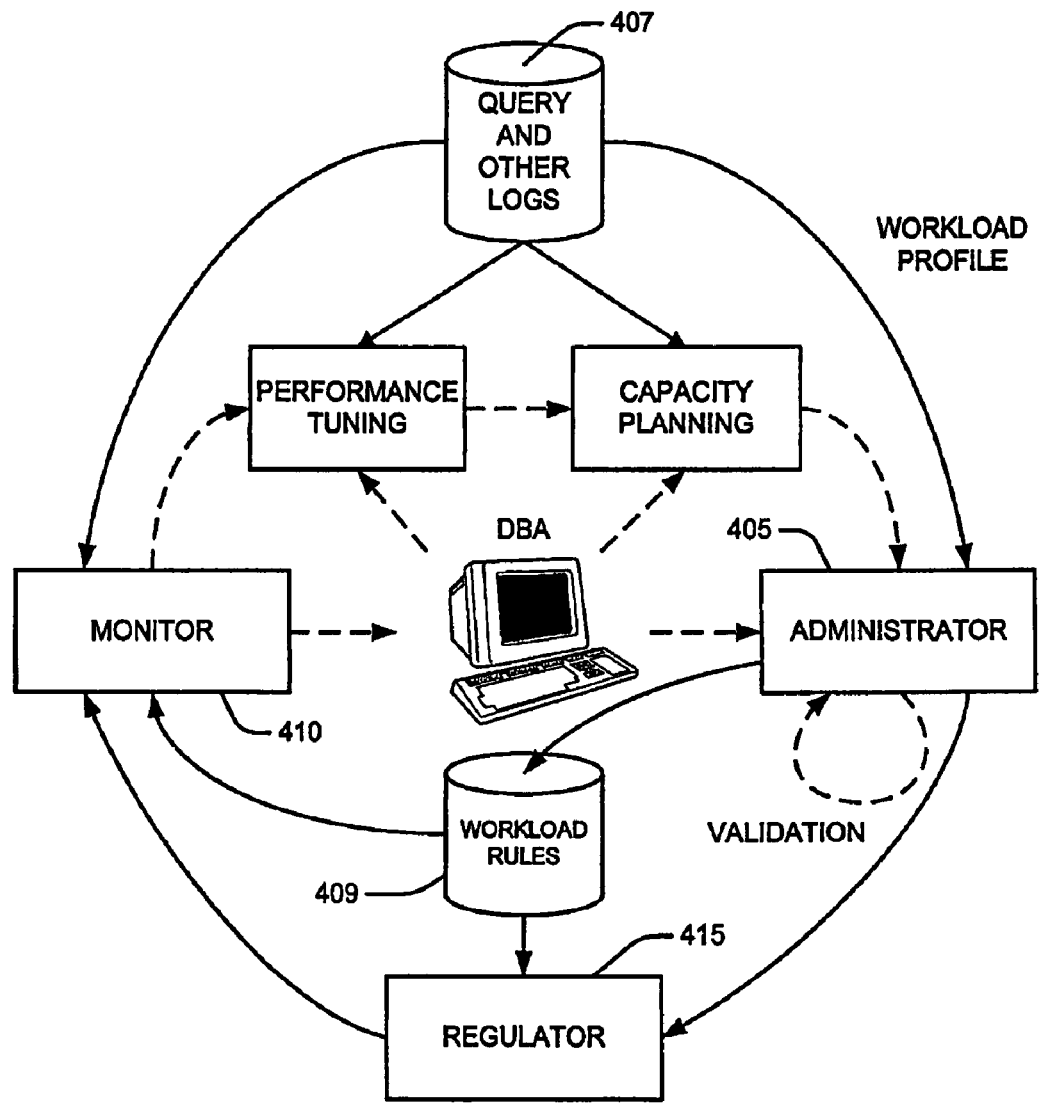
FIGS. 4-7 are block diagrams of a system for administering the workload of a database system.

The system includes the following components (illustrated in FIG. 4):

1) Administrator (block 405): This component provides a GUI to define workloads and their SLGs and other workload management requirements. The administrator 405 accesses data in logs 407 associated with the system, including a query log, and receives capacity planning and performance tuning inputs as discussed above. The administrator 405 is a primary interface for the DBA. The administrator also establishes workload rules 409, which are accessed and used by other elements of the system.

2) Monitor (block 410): This component provides a top level dashboard view, and the ability to drill down to various details of workload group performance, such as aggregate execution time, execution time by request, aggregate resource consumption, resource consumption by request, etc. Such data is stored in the query log and other logs 407 available to the monitor. The monitor also includes processes that initiate the performance improvement mechanisms listed above and processes that provide long term trend reporting, which may including providing performance improvement recommendations. Some of the monitor functionality may be performed by the regulator, which is described in the next paragraph.

3) Regulator (block 415): This component dynamically adjusts system settings and/or projects performance issues and either alerts the DBA or user to take action, for example, by communication through the monitor, which is capable of providing alerts, or through the exception log, providing a way for applications and their users to become aware of, and take action on, regulator actions. Alternatively, the regulator 415 can automatically take action by deferring requests or executing requests with the appropriate priority to yield the best solution given requirements defined by the administrator (block 405).

The workload management administrator (block 405), or "administrator," is responsible for determining (i.e., recommending) the appropriate application settings based on SLGs. Such activities as setting weights, managing active work tasks and changes to any and all options will be automatic and taken out of the hands of the DBA. The user will be masked from all complexity involved in setting up the priority scheduler, and be freed to address the business issues around it.

Figure 5:
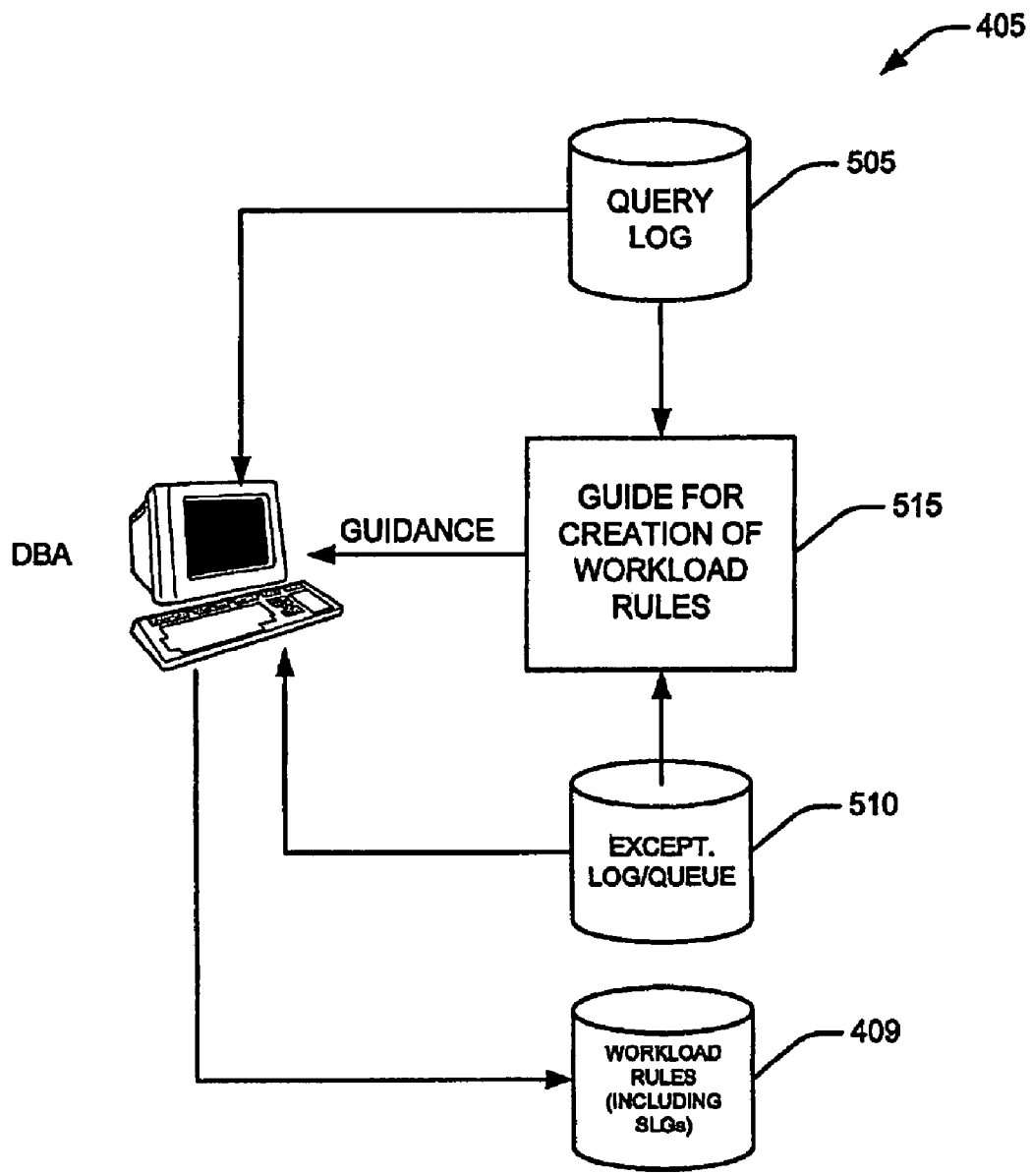

As shown in FIG. 5, the workload management administrator (block 405) allows the DBA to establish workload rules, including SLGs, which are stored in a storage facility 409, accessible to the other components of the system. The DBA has access to a query log 505, which stores the steps performed by the DBS 100 in executing a request along with database statistics associated with the various steps, and an exception log/queue 510, which contains records of the system's deviations from the SLGs established by the administrator. With these resources, the DBA can examine past performance and establish SLGs that are reasonable in light of the available system resources. In addition, the system provides a guide for creation of workload rules 515 which guides the DBA in establishing the workload rules 409. The guide accesses the query log 505 and the exception log/queue 510 in providing its guidance to the DBA.

The administrator assists the DBA in: a) Establishing rules for dividing requests into candidate workload groups, and creating workload group definitions. Requests with similar characteristics (users, application, table, resource requirement, etc) are assigned to the same workload group. The system supports the possibility of having more than one workload group with similar system response requirements. b) Refining the workload group definitions and defining SLGs for each workload group. The system provides guidance to the DBA for response time and/or arrival rate threshold setting by summarizing response time and arrival rate history per workload group definition versus resource utilization levels, which it extracts from the query log (from data stored by the regulator, as described below), allowing the DBA to know the current response time and arrival rate patterns. The DBA can then cross-compare those patterns to satisfaction levels or business requirements, if known, to derive an appropriate response time and arrival rate threshold setting, i.e., an appropriate SLG. After the administrator specifies the SLGs, the system automatically generates the appropriate resource allocation settings, as described below. These SLG requirements are distributed to the rest of the system as workload rules. c) Optionally, establishing priority classes and assigning workload groups to the classes. Workload groups with similar performance requirements are assigned to the same class. d) Providing proactive feedback (i.e., validation) to the DBA regarding the workload groups and their SLG assignments prior to execution to better assure that the current assignments can be met, i.e., that the SLG assignments as defined and potentially modified by the DBA represent realistic goals. The DBA has the option to refine workload group definitions and SLG assignments as a result of that feedback.

Figure 6:
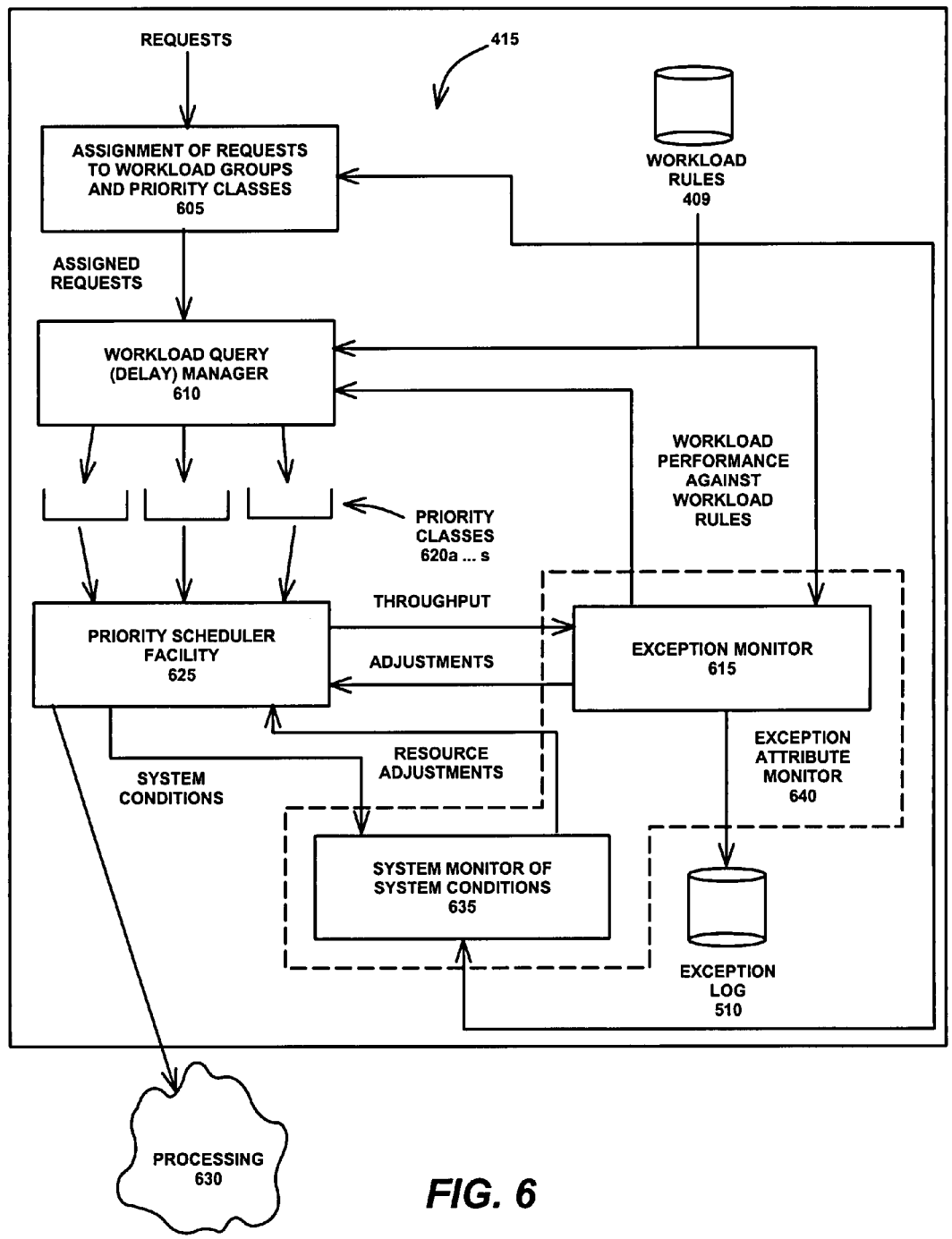

The internal monitoring and regulating component (regulator 415), illustrated in more detail in FIG. 6, accomplishes its objective by dynamically monitoring the workload characteristics (defined by the administrator) using workload rules or other heuristics based on past and current performance of the system that guide two feedback mechanisms. It does this before the request begins execution and at periodic intervals during query execution. Prior to query execution, an incoming request is examined to determine in which workload group it belongs, based on criteria as described in more detail below. Concurrency or arrival rate levels, i.e., the numbers of concurrent executing queries from each workload group, are monitored or the rate at which they have been arriving, and if current workload group levels are above an administrator-defined threshold, a request in that workload group waits in a queue prior to execution until the level subsides below the defined threshold. Query execution requests currently being executed are monitored to determine if they still meet the criteria of belonging in a particular workload group by comparing request execution characteristics to a set of exception conditions. If the result suggests that a request violates the rules associated with a workload group, an action is taken to move the request to another workload group or to abort it, and/or alert on or log the situation with potential follow-up actions as a result of detecting the situation. Current response times and throughput of each workload group are also monitored dynamically to determine if they are meeting SLGs. A resource weight allocation for each performance group can be automatically adjusted to better enable meeting SLGs using another set of heuristics described with respect to FIG. 6.

As shown in FIG. 6, the regulator 415 receives one or more requests, each of which is assigned by an assignment process (block 605) to a workload group and, optionally, a priority class, in accordance with the workload rules 409. The assigned requests are passed to a workload query (delay) manager 610, which is described in more detail with respect to FIG. 7. The regulator 415 includes an exception monitor 615 for detecting workload exceptions, which are recorded in a log 510.

In general, the workload query (delay) manager 610 monitors the workload performance from the exception monitor 615, as compared to the workload rules 409, and either allows the request to be executed immediately or places it in a queue for later execution, as described below, when predetermined conditions are met.

If the request is to be executed immediately, the workload query (delay) manager 610 places the requests in buckets $620_{a\ldots s}$ corresponding to the priority classes to which the requests were assigned by the administrator 405. A request processor function performed under control of a priority scheduler facility (PSF) 625 selects queries from the priority class buckets $620_{a\ldots s}$, in an order determined by the priority associated with each of the buckets $620_{a\ldots s}$, and executes it, as represented by the processing block 630 on FIG. 6.

The PSF 625 also monitors the request processing and reports throughput information, for example, for each request and for each workgroup, to the exception monitor 615. Also included is a system condition monitor 635, which is provided to detect system conditions, such as node failures. The exception monitor 615 and system monitor 635 collectively define an exception attribute monitor 640.

The exception monitor 615 compares the throughput with the workload rules 409 and stores any exceptions (e.g., throughput deviations from the workload rules) in the exception log/queue 510. In addition, the exception monitor 615 provides system resource allocation adjustments to the PSF 625, which adjusts system resource allocation accordingly, e.g., by adjusting the priority scheduler weights. Further, the exception monitor 615 provides data regarding the workgroup performance against workload rules to the workload query (delay) manager 610, which uses the data to determine whether to delay incoming requests, depending on the workload group to which the request is assigned.

As can be seen in FIG. 6, the system provides two feedback loops. The first feedback loop includes the PSF 625 and the exception monitor 615. In this first feedback loop, the system monitors, on a short-term basis, the execution of requests to detect deviations greater than a short-term threshold from the defined service level for the workload group to which the requests were defined. If such deviations are detected, the DBS 100 is adjusted, e.g., by adjusting the assignment of system resources to workload groups.

The second feedback loop includes the workload query (delay) manager 610, the PSF 625 and the exception monitor 615. In this second feedback loop, the system monitors, on a long-term basis, to detect deviations from the expected level of service greater than a long-term threshold. If it does, the system adjusts the execution of requests, e.g., by delaying, swapping out or aborting requests, to better provide the expected level of service. Note that swapping out requests is one form of memory control in the sense that before a request is swapped out it consumes memory and after it is swapped out it does not. While this is the preferable form of memory control, other forms, in which the amount of memory dedicated to an executing request can be adjusted as part of the feedback loop, are also possible.

Figure 7:
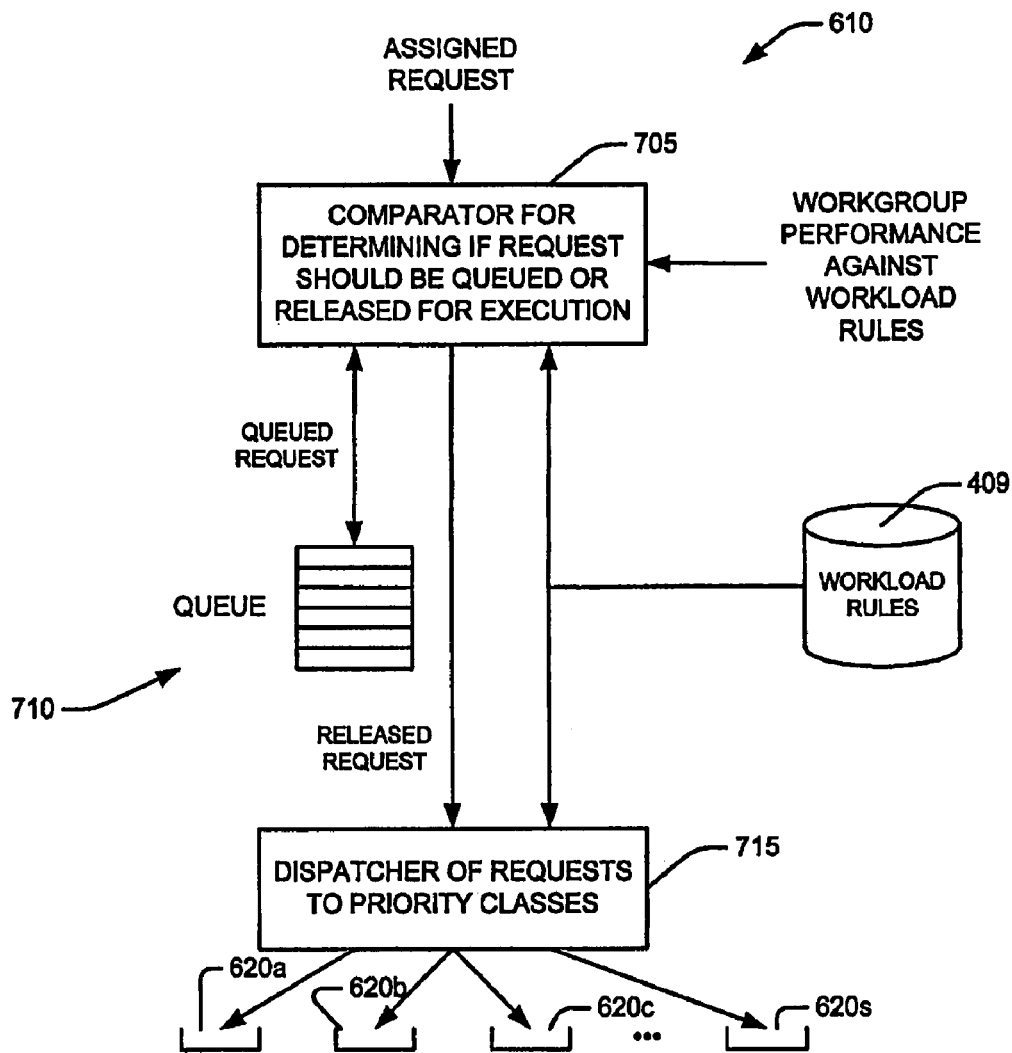

The workload query (delay) manager 610, shown in greater detail in FIG. 7, receives an assigned request as an input. A comparator 705 determines if the request should be queued or released for execution. It does this by determining the workload group assignment for the request and comparing that workload group's performance against the workload rules, provided by the exception monitor 615. For example, the comparator 705 may examine the concurrency level of requests being executed under the workload group to which the request is assigned. Further, the comparator may compare the workload group's performance against other workload rules.

If the comparator 705 determines that the request should not be executed, it places the request in a queue 710 along with any other requests for which execution has been delayed. The comparator 705 continues to monitor the workgroup's performance against the workload rules and when it reaches an acceptable level, it extracts the request from the queue 710 and releases the request for execution. In some cases, it is not necessary for the request to be stored in the queue to wait for workgroup performance to reach a particular level, in which case it is released immediately for execution.

Once a request is released for execution it is dispatched (block 715) to priority class buckets $620_{a \ldots s}$, where it will await retrieval and processing by one of a series of AMP Worker Tasks (AWTs) 625. An AWT 625 is a thread/task that runs inside of each virtual AMP. An AWT 625 is generally utilized to process requests/queries from users, but may also be triggered or used by internal database software routines, such as deadlock detection.

The exception monitor 615, receives throughput information from the AWT 625. A workload performance to workload rules comparator 705 compares the received throughput information to the workload rules and logs any deviations that it finds in the exception log/queue 510. It also generates the workload performance against workload rules information that is provided to the workload query (delay) manager 610.

Pre-allocated AWTs are assigned to each AMP and work on a queue system. That is, each AWT waits for work to arrive, performs the work, and then returns to the queue and waits for more work. Due to their stateless condition, AWTs respond quickly to a variety of database execution needs. At the same time, AWTs serve to limit the number of active processes performing database work within each AMP at any point in time. In other words, AWTs play the role of both expeditor and governor of requests/queries.

AMP worker tasks are one of several resources that support the parallel performance architecture within the Teradata database. AMP worker tasks are of a finite number, with a limited number available to perform new work on the system. This finite number is an orchestrated part of the internal work flow management in Teradata. Reserving a special set of reserve pools for single and few-AMP queries may be beneficial for active data warehouse applications, but only after establishing a need exists. Understanding and appreciating the role of AMP worker tasks, both in their availability and their scarcity, leads to the need for a more pro-active management of AWTs and their usage.

AMP worker tasks are execution threads that do the work of executing a query step, once the step is dispatched to the AMP. They also pick up the work of spawned processes, and of internal tasks such as error logging or aborts. Not being tied to a particular session or transaction, AMP worker tasks are anonymous and immediately reusable and are able to take advantage of any of the CPUs. Both AMPs and AWTs have equal access to any CPU on the node. A fixed number of AWTs are pre-allocated at startup for each AMP in the configuration, with the default number being 80. All of the allocated AWTs can be active at the same time, sharing the CPUs and memory on the node.

When a query step is sent to an AMP, that step acquires a worker task from the pool of available AWTs. All of the information and context needed to perform the database work is contained within the query step. Once the step is complete, the AWT is returned to the pool. If all AMP worker tasks are busy at the time the message containing the new step arrives, then the message will wait in a queue until an AWT is free. Position in the queue is based first on work type, and secondarily on priority, which is carried within the message header. Priority is based on the relative weight that is established for the PSF 625 allocation group that controls the query step. Too much work can flood the best of databases. Consequently, all database systems have built-in mechanisms to monitor and manage the flow of work in a system. In a parallel database, flow control becomes even more pressing, as balance is only sustained when all parallel units are getting their fair portion of resources.

The Teradata database is able to operate near the resource limits without exhausting any of them by applying control over the flow of work at the lowest possible level in the system. Each AMP monitors its own utilization of critical resources, AMP worker tasks being one. If no AWTs are available, it places the incoming messages on a queue. If messages waiting in the queue for an AWT reach a threshold value, further message delivery is throttled for that AMP, allowing work already underway to complete. Other AMPs continue to work as usual.

One technique that has proven highly effective in helping Teradata to weather extremely heavy workloads is having a reasonable limit on the number of active tasks on each AMP. The theory behind setting a limit on AWTs is twofold: 1) that it is better for overall throughput to put the brakes on before exhaustion of all resources is reached; and 2) keeping all AMPs to a reasonable usage level increases parallel efficiency. However this is not a reasonable approach in a dynamic environment.

Ideally, the minimum number of AWTs that can fully utilize the available CPU and I/O are employed. After full use of resources has been attained, adding AWTs will only increase the effort of sharing. As standard queuing theory teaches, when a system has not reached saturation, newly-arriving work can get in, use its portion of the resources, and get out efficiently. However, when resources are saturated, all newly-arriving work experiences delays equal to the time it takes someone else to finish their work. In the Teradata database, the impact of any delay due to saturation of resources may be aggravated in cases where a query has multiple steps, because there will be multiple places where a delay could be experienced.

In one particular implementation of the Teradata database, 80 (eighty) is selected as the maximum number of AWTs, to provide the best balance between AWT overhead and contention and CPU and I/O usage. Historically, 80 has worked well as a number that makes available a reasonable number of AWTs for all the different work types, and yet supports up to 40 or 50 new tasks per AMP comfortably. However, managing AWTs is not always a solution to increased demands on the DBS 100. In some cases, an increased demand on system resources may have an underlying cause, such that simply increasing the number of available AWTs may only serve to temporarily mask, or even worsen the demand on resources.

For example, one of the manifestations of resource exhaustion is a lengthening queue for processes waiting for AWTs. Therefore, performance may degrade coincident with a shortage of AWTs. However, this may not be directly attributable to the number of AWTs defined. In this case, adding AWTs will tend to aggravate, not reduce, performance issues.

Using all 80 AWTs in an on-going fashion is a symptom that resource usage is being sustained at a very demanding level. It is one of several signs that the platform may be running out of capacity. Adding AWTs may be treating the effect, but not helping to identify the cause of the performance problem. On the other hand, many Teradata database systems will reach 100% CPU utilization with significantly less than 50 active processes of the new work type. Some sites experience their peak throughput when 40 AWTs are in use servicing new work. By the time many systems are approaching the limit of 80 AWTs, they are already at maximum levels of CPU or I/O usage.

In the case where the number of AWTs is reaching their limit, it is likely that a lack of AWTs is merely a symptom of a deeper underlying problem or bottleneck. Therefore, it is necessary to carry out a more thorough investigation of all events in the DBS 100, in an attempt to find the true source of any slowdowns. For example, the underlying or "real" reason for an increase in CPU usage or an increase in the number of AWTs may be a hardware failure or an arrival rate surge.

Another issue that can impact system-wide performance is a workload event, such as the beginning or conclusion of a load or another maintenance job that can introduce locks or other delays into the DBS 100 or simply trigger the need to change the workload management scheme for the duration of the workload event. The DBS 100 provides a scheduled environment that manages priorities and other workload management controls in operating "windows" that trigger at certain times of the day, week, and/or month, or upon receipt of a workload event.

Figure 8:
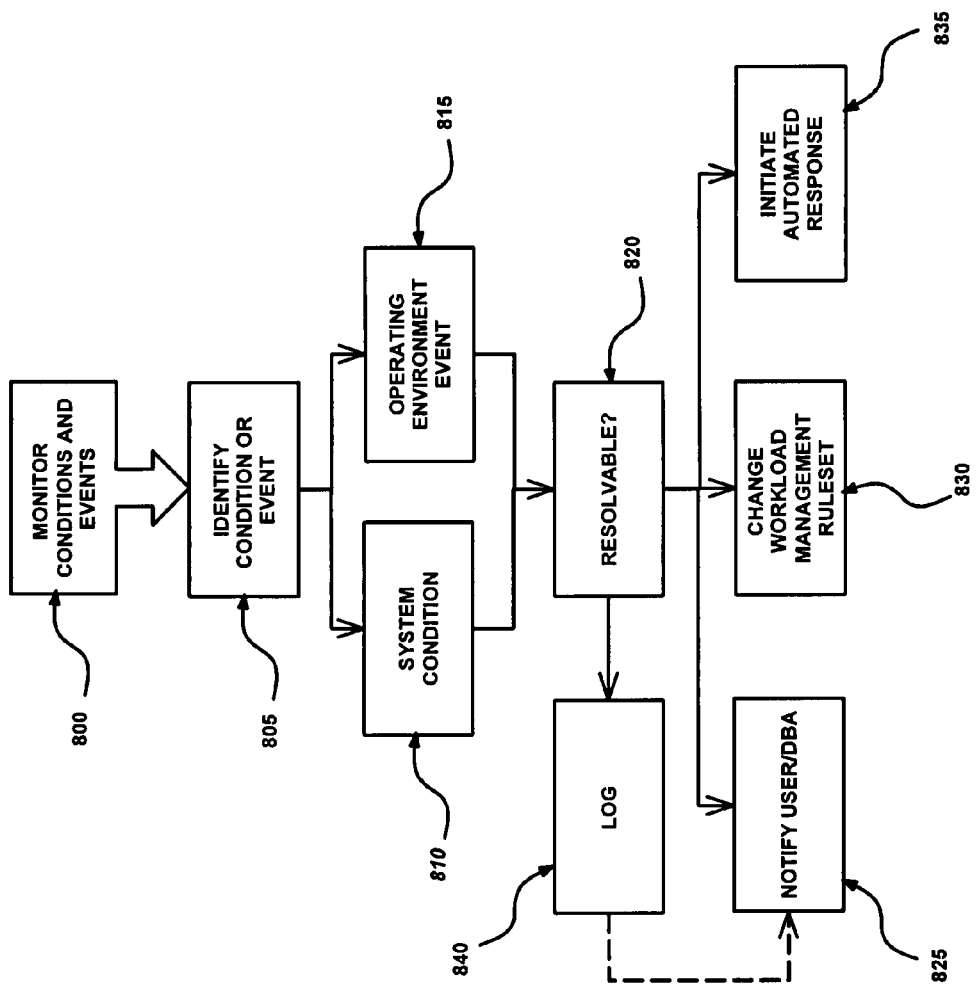
FIG. 8 is a flow chart of an event categorization and management system.

To manage workloads among these dynamic, system-wide situations, it is important to firstly classify the types of various system events that can occur in a DBS 100, in order to better understand the underlying causes of inadequate performance. As shown in FIG. 8, a plurality of conditions and events are monitored (block 800) and then identified (block 805) so that they can be classified into at least 2 general categories:

1. System Conditions (block 810), i.e., system availability or performance conditions; and
2. Operating Environment Events (block 815).

System Conditions 810 can include a system availability condition, such as a hardware component failure or recovery, or any other condition monitored by a TASM monitored queue. This may include a wide range of hardware conditions, from the physical degradation of hardware (e.g., the identification of bad sectors on a hard disk) to the inclusion of new hardware (e.g., hot swapping of CPUs, storage media, addition of I/O or network capabilities, etc). It can also include conditions external to the DBS 100 as relayed to the DBS 100 from the enterprise, such as an application server being down, or a dual/redundant system operating in degraded mode.

System Conditions 810 can also include a system performance condition, such as sustained resource usage, resource depletion, resource skew or missed Service Level Goals (SLGs).

An example of a system performance condition is the triggering of an action in response to an ongoing use (or non-use) of a system resource. For example, if there is low sustained CPU and IO for some qualifying time, then a schedule background task may be allowed to run. This can be achieved by lifting throttle limits, raising priority weights and/or other means. Correspondingly, if the system returns to a high sustained use of the CPU and IO, then the background task is reduced (e.g., terminated, priority weights lowered, throttle limits lowered, etc).

Another example of a system performance condition is where a condition is detected due to an increase in the time taken to process a given individual request or workload group. For example, if the average response time is greater than the SLG for a given time interval, then there may be an underlying system performance condition.

Yet another example may be a sudden increase in the number of AWTs invoked (as described earlier).

In other words, system performance conditions can include the following:

1. Any sustained high or low usage of a resource, such as high CPU usage, high IO usage, a higher than average arrival rate, or a high concurrency rate;
2. Any unusual resource depletion, such as running out of AWTs, problems with flow control, and unusually high memory usage;
3. Any system skew, such as overuse of a particular CPU in a CPU cluster, or AWT overuse in a AWT cluster; and
4. Missed SLGs.

The second type of detection is an Operating Environment Event 815. Such events can be predetermined or scheduled, in that a user or administrator of the system predefines the event at some point during the operation of the DBS 100. However, in some instances, Operating Environment Events 815 can occur without any appreciable notice being given to the DBS 100 or to users. The event may be time based, business event based or based on any other suitable criteria.

Operating Environment Events 815 can also be defined and associated with the beginning and completion of a particular application job. A user-defined event can be sent by the application and received by the DBS 100. This triggers the regulator of the DBS 100 to operate in the ruleset's working values associated with this event. For example, the working values could direct the DBS 100 to give higher priority to workloads associated with month-end processing, or lower priority associated with workloads doing "regular" work, to enable throttles for non-critical work, and enable filters on workloads that interfere with month-end processing reporting consistency such as might happen when data is being updated while it is being reported on.

In another example, a user may define actions associated with the start of a daily load against a table X. This request triggers a phased set of actions:

1. Upon the "Begin Acquisition Phase" of MultiLoad to Table X;
   Promote the priority of all queries that involve table X;
   At the same time, restrict the ability for new queries involving table X from starting until after the data load is completed. Do this through delay, scheduling or disallowing the query upon request;
2. Upon completion of the acquisition phase and the beginning of the "Apply Phase", previously promoted queries that are still running are aborted ("Times Up!");
3. Upon completion of data load, lift restrictions on queries involving table X, and allow scheduled and delayed queries to resume.

Another example is to allow the user to define and automate ruleset working value changes based on a user-event (rather than resource or time changes). For example, users may want resource allocation to change based on a business calendar that treats weekends and holidays differently from weekdays, and normal processing differently from quarterly or month-end processing.

As these events are generally driven by business or user considerations, and not necessarily by hardware or software considerations, they are difficult to predict in advance.

Thus, upon detection of any of System Conditions 810 or Operating Environments Events 815, one or more actions can be triggered. In this regard, Block 820 determines whether the detected System Conditions 810 or Operating Environments Events 815 are resolvable.

The action taken in response to the detection of a particular condition or event will vary depending on the type of condition or event detected. The automated action will fall into one of four broad categories (as shown in FIG. 8):

1. Notify (block 825);
2. Change the Workload Management Ruleset's Working Values (block 830);
3. Initiate an automated response (block 835); and
4. Log the event or condition, if the condition or event is not recognized (block 840).

Turning to the first possible automated action, the system may notify either a person or another software application/component including, users, the DBA, or a reporting application.

Notification can be through one or more notification approaches:

Notification through a TASM event queue monitored by some other application (for example, "tell users to expect slow response times");

Notification through sending an Alert; and/or

Notification (including diagnostic drill-down) through automation execution of a program or a stored procedure.

Notification may be preferable where the system has no immediate way in which to ameliorate or rectify the condition, or where a user's expectation needs to be managed.

A second automated action type is to change the Workload Management Ruleset's working values.

Figure 9:
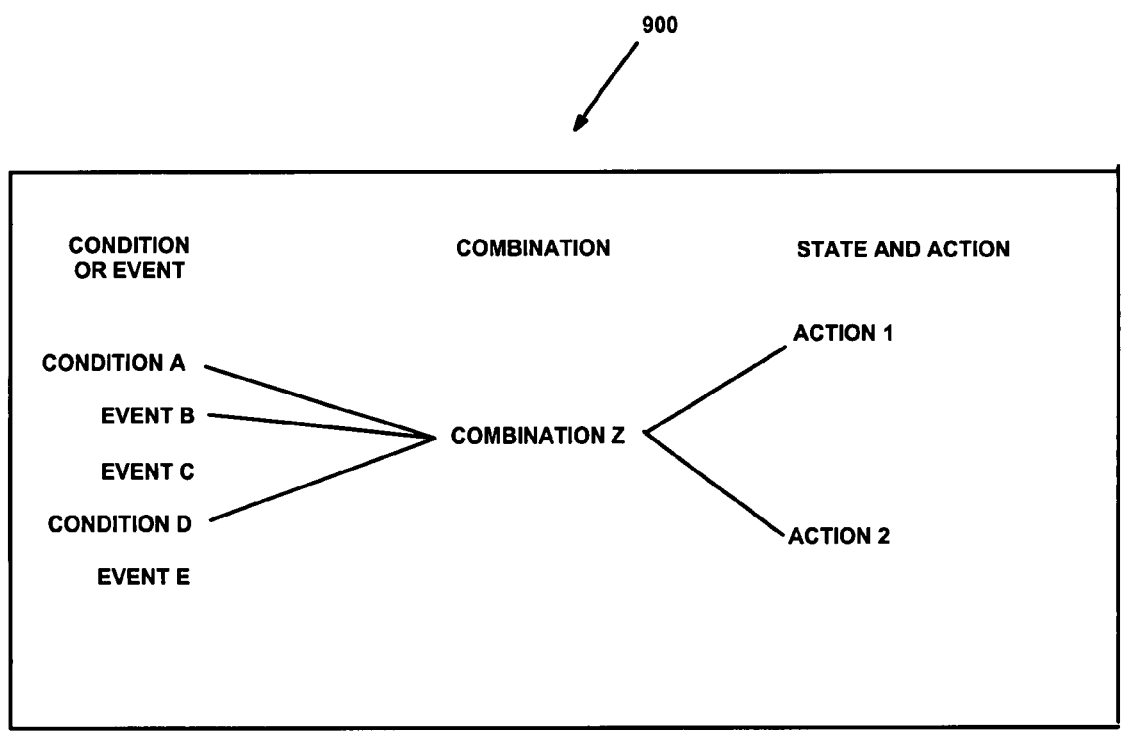
FIG. 9 illustrates how conditions and events may be comprised of individual conditions or events and condition or event combinations.

FIG. 9 illustrates how conditions and events may be comprised of individual conditions or events and condition or event combinations, which in turn cause the resulting actions.

The following is a table that represents kinds of conditions and events that can be detected.

| Class | Type | Description |
| --- | --- | --- |
| Operating Environment Event | (Time) Period | These are the current Periods representing intervals of time during the day, week, or month. The system monitors the system time, automatically causing an event when the period starts, and it will last until the period ends. |
| | User Defined (External)* | These are used to report anything that could conceivably change an operating environment, such as application events. They last until rescinded or optionally time out. |
| System Condition | Performance and Availability | DBS 100 components degrade or fail, or resources go below some threshold for some period of time. The system will do the monitoring of these events. Once detected, the system will keep the event in effect until the component is back up or the resource goes back above the threshold value for some minimal amount of time. |
| | User Defined (External)* | These are used to report anything that could conceivably change a system condition, such as dual system failures. They last until rescinded or optionally time out. |

Operating Environment Events and System Condition combinations are logical expressions of states. The simplest combinations are comprised of just one state. More complex combinations can be defined that combine multiple states with two or more levels of logical operators, for example, given four individual states, e1 through e4:

| Operator Levels | Logical Expression |
| --- | --- |
| 0 | e1 |
| 1 | e1 OR e2 |
| 1 | e1 AND e2 |
| 2 | (e1 OR e2) AND (e3 OR e4) |
| 2 | (e1 AND e2 AND (e3 OR e4)) |

Combinations cause one more actions when the logical expressions are evaluated to be "true." The following table outlines the kinds of actions that are supported.

| Type | Description |
| --- | --- |
| Alert | Use the alert capability to generate an alert. |
| Program | Execute a program to be named. |
| Queue Table | Write to a (well known) queue table. |
| SysCon | Change the System Condition. |
| OpEnv | Change the Operating Environment. |

Figure 10:
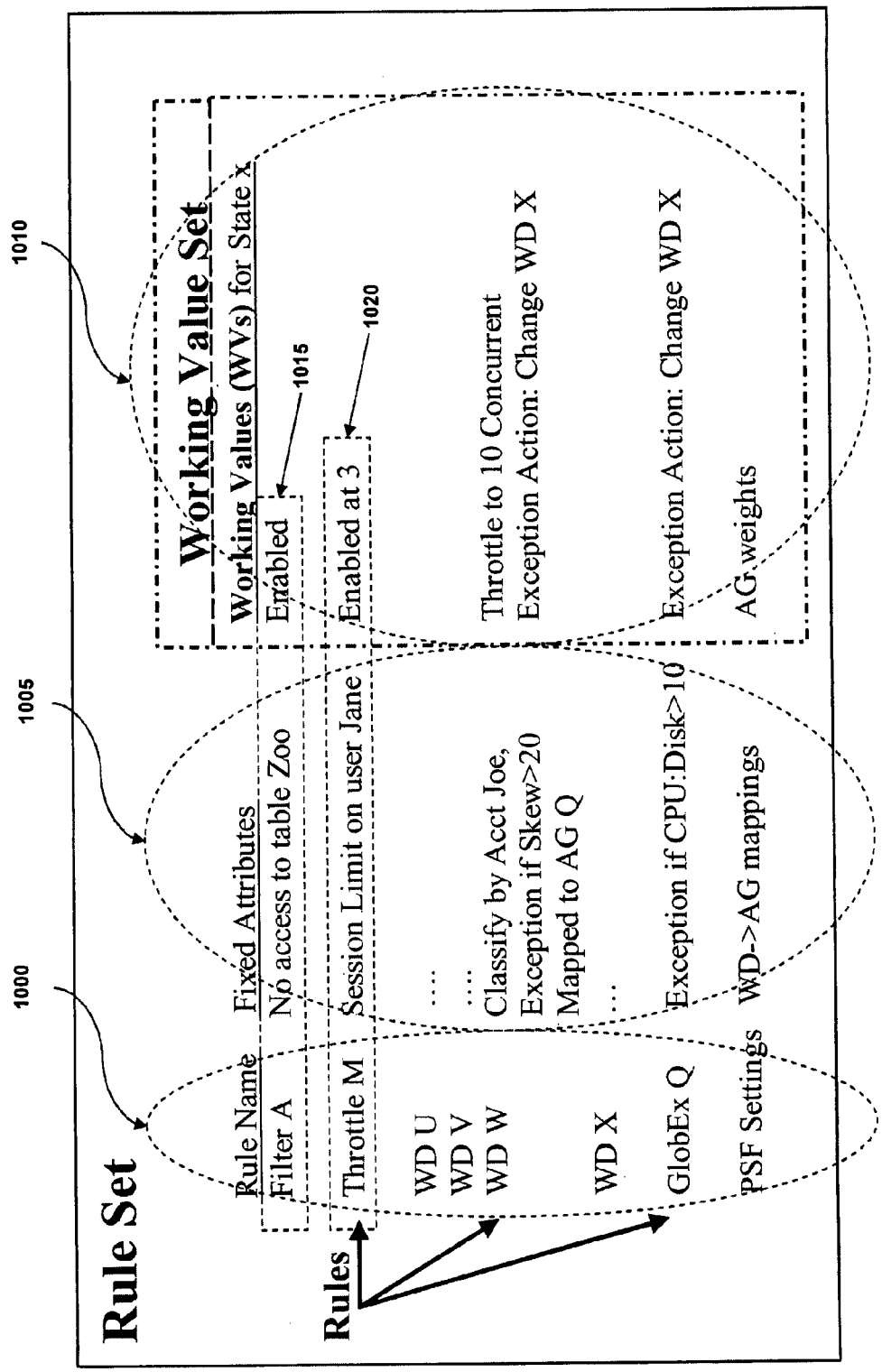
FIG. 10 is a table depicting an example rule set and working value set.

As shown in FIG. 10, the DBS 100 has a number of rules (in aggregation termed a ruleset) which define the way in which the DBS 100 operates. The rules include a name (block 1000), attributes (block 1005), which describes what the rules do (e.g., session limit on user Jane) and working values (WVs) (block 1010), which are flags or values that indicate whether the rule is active or not and the particular setting of the value. A set of all WVs for all the rules contained in a Ruleset is called a "Working Value Set (WVS)."

A number of "states" can be defined, each state being associated with a particular WVS (i.e., a particular instance of a rule set). By swapping states, the working values of the workload management ruleset are changed.

This process is best illustrated by a simple example. At FIG. 10, there is shown a particular WVS which, in the example, is associated with the State "X." State X, in the example, is a state that is invoked when the database is at almost peak capacity, Peak capacity, in the present example, is determined by detecting one of two events, namely that the arrival rate of jobs is greater than 50 per minute, or alternatively, that there is a sustained CPU usage of over 95% for 600 seconds. State X is designed to prevent resources being channeled to less urgent work. In State X, Filter A (block 1015), which denies access to table "Zoo" (which contains cold data and is therefore not required for urgent work), is enabled. Furthermore, Throttle M (block 1020), which limits the number of sessions to user "Jane" (a user who works in the marketing department, and therefore does not normally have urgent requests), is also enabled. State "X" is therefore skewed towards limiting the interaction that user Jane has with the DBS 100, and is also skewed towards limiting access to table Zoo, so that the DBS 100 can allocate resources to urgent tasks in preference to non-urgent tasks.

A second State "Y" (not shown) may also be created. In State "Y", the corresponding rule set disables filter "A", and increases Jane's session limit to 6 concurrent sessions. Therefore, State "Y" may only be invoked when resource usage falls below a predetermined level. Each state is predetermined (i.e., defined) beforehand by a DBA. Therefore, each ruleset, working value set and state requires some input from a user or administrator that has some knowledge of the usage patterns of the DBS 100, knowledge of the data contained in the database, and perhaps even knowledge of the users. Knowledge of workloads, their importance, their characteristic is most likely required more so than the same understanding of individual rules. Of course, as a user defines workloads, most of that has already come to light, i.e., what users and requests are in a workload, how important or critical is the workload, etc. A third action type is to resolve the issue internally.

Resolution by the DBS 100 is in some cases a better approach to resolving issues, as it does not require any input from a DBA or a user to define rules-based actions.

Resolution is achieved by implementing a set of internal rules which are activated on the basis of the event detected and the enforcement priority of the request along with other information gathered through the exception monitoring process.

Some examples of automated action which result in the automatic resolution of issues are given below. This list is not exhaustive and is merely illustrative of some types of resolution.

For the purposes of this example, it is assumed that the event that is detected is a longer than average response time (i.e., an exception monitor 615 detects that the response time SLG is continually exceed for a given time and percentage). The first step in launching an automated action is to determine whether an underlying cause can be identified.

For example, is the AWT pool the cause of the longer than average response time? This is determined by seeing how many AWTs are being used. If the number of idle or inactive AWTs is very low, the AWT pool is automatically increased to the maximum allowed (normally 80 in a typical Teradata system).

The SLG is then monitored to determine whether the issue has been ameliorated. When the SLG is satisfactory for a qualifying time, the AWT poolsize is progressively decreased until a suitable workable value is found.

However, the AWT pool may not be the cause of the event. Through the measuring of various system performance indicators, it may be found that the Arrival Rate is the cause of decreased performance. Therefore, rather than limiting on concurrency, the DBS 100 can use this information to take the action of limiting the arrival rate (i.e., throttle back the arrival rate to a defined level, rather than allowing queries to arrive at unlimited rates). This provides an added ability to control the volume of work accepted per WD.

Alternatively, there may be some WDs at same or lower enforcement exceeding their anticipated arrival rates by some qualifying time and amount. This is determined by reviewing the anticipated arrival rate as defined by the SLG.

If there are WDs at the same or lower enforcement exceeding their anticipated arrival rates, the WD's concurrency level is decreased to a minimum lower limit.

The SLG is then monitored, and when the SLG returns to a satisfactory level for a qualifying time, the concurrency level is increased to a defined normal level (or eliminated if no concurrency level was defined originally).

If the event cannot be easily identified or categorized by the DBS 100, then the event is simply logged as a "un-resolvable" problem. This provides information which can be studied at a later date by a user and/or DBA, with a view to identifying new and systemic problems previously unknown.

The embodiment described herein, through a mixture of detection and management techniques, seeks to correctly manage users' expectations and concurrently smooth the peaks and valleys of usage. Simply being aware of the current or projected usage of the DBS 100 may be a viable solution to smoothing peaks and valleys of usage. For example, if a user knows that he needs to run a particular report "sometime today," he may avoid a high usage (and slow response) time in the morning in favor of a lower usage time in the afternoon. Moreover, if the work cannot be delayed, insight into DBS 100 usage can, at the very least, help set reasonable expectations.

Moreover, the predetermined response to events, through the invocation of different "states" (i.e., changes in the ruleset's working values) can also assist in smoothing peaks and valleys of usage. The embodiment described herein additionally seeks to manage automatically to better meet SLGs, in light of extenuating circumstances such as hardware failures, enterprise issues and business conditions.

However, automated workload management needs to act differently depending on what states are active on the system at any given time. Each unique combination of conditions and events could constitute a unique state with unique automated actions. Given a myriad of possible condition and event types and associated values, a combinatorial explosion of possible states can exist, making rule-based automated workload management a very daunting and error-prone task. For example, given just 15 different condition and event types that get monitored, each with a simple on or off value, there can be as many as $2^{15}$=32,768 possible combinations of states. This number only increases as the number of unique condition and event types or the possible values of each monitored condition or event type increases.

A DBA managing the rules-based management system, after identifying each of these many states must also to designate a unique action for each state. The DBA would further need to associate priority to each state such that if more than one state were active at a given time, the automated workload management scheme would know which action takes precedence if the actions conflict. In general, the DBA would find these tasks overwhelming or even impossible, as it is extremely difficult to manage such an environment.

To solve this problem associated with automated workload management, or any rule-driven system in general, the present invention introduces an n-dimensional matrix to tame the combinatorial explosion of states and to provide a simpler perspective to the rules-based environment. Choosing two or more well-known key dimensions provides a perspective that guides the DBA to know whether or not he has identified all the important combinations, and minimizes the number of unique actions required when various combinations occur. Given that n<total possible event types that can be active, each unique event or event combination is collapsed into a finite number of one of the n-dimension elements.

Figure 11:
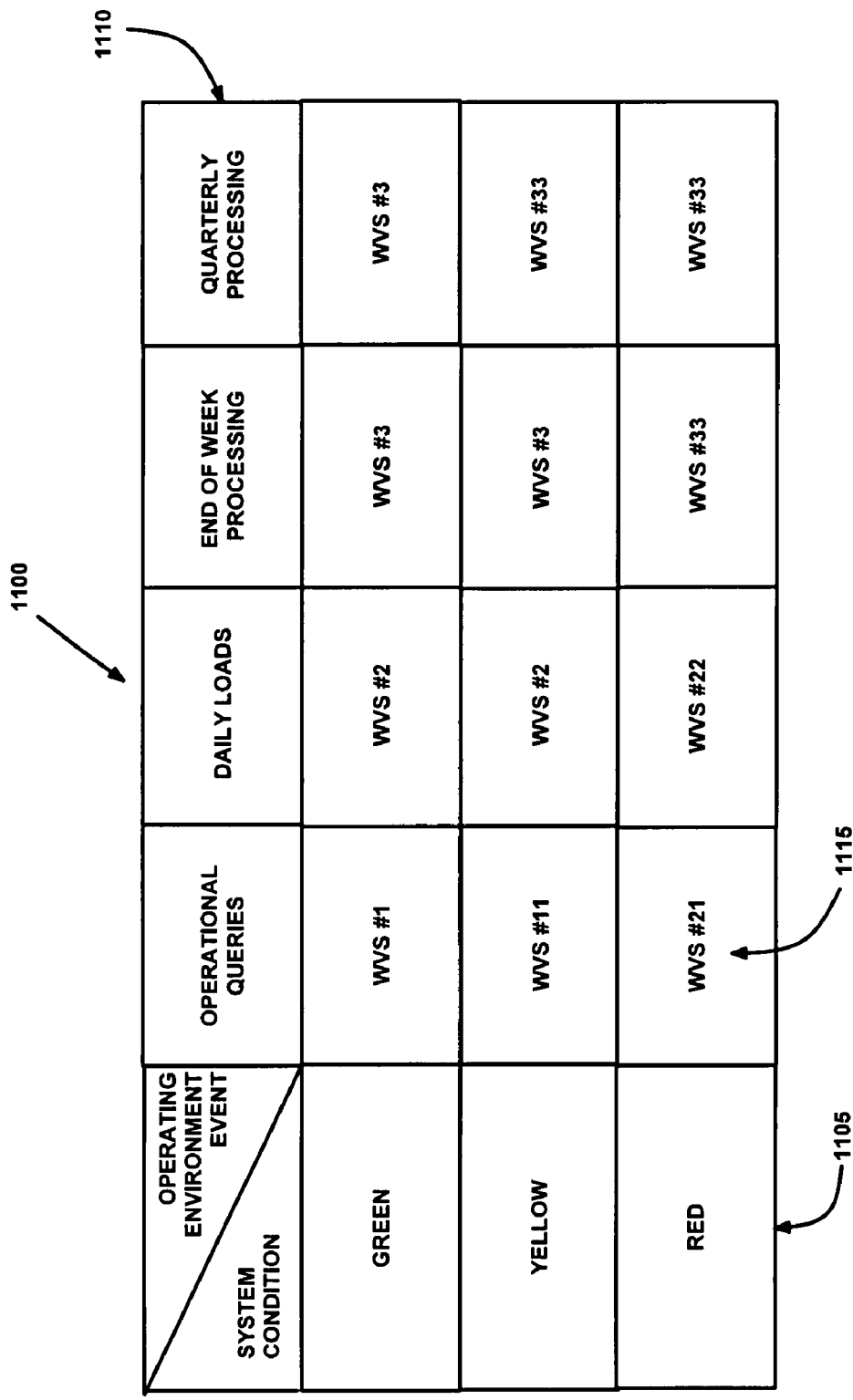
FIG. 11 illustrates an n-dimensional matrix that is used to perform with automated workload management.

In one embodiment, for example, as shown in FIG. 11, a two-dimensional state matrix 1100 may be used, wherein the first dimension 1105 represents the System Condition (SysCon) and the second dimension 1110 represents the Operating Environment Events (OpEnv). As noted above, System Conditions 1105 represent the "condition" or "health" of the system, e.g., degraded to the "red" system condition because a node is down, while Operating Environment Events 1110 represent the "kind of work" that the system is being expected to perform, e.g., within an Interactive or Batch operational environment, wherein Interactive takes precedence over Batch.

Each element 1115 of the state matrix 1100 is a <SysCon, OpEnv> pair that references a workload management state, which in turn invokes a single WVS instance of the workload management ruleset. Multiple matrix 1100 elements may reference a common state and thus invoke the same WVS instance of the workload management ruleset. However, only one state is in effect at any given time, based on the matrix 1100 element 1115 referenced by the highest SysCon severity and the highest OpEnv precedence in effect. On the other hand, a System Condition, Operating Environment Event, or state can change as specified by directives defined by the DBA. One of the main benefits of the state matrix 1100 is that the DBA does not specify a state change directly, but must do so indirectly through directives that change the SysCon or OpEnv.

When a particular condition or event combination is evaluated to be true, it is mapped to one of the elements 1115 of one of the dimensions of the matrix 1100. For example, given the condition "if AMP Worker Tasks available is less than 3 and Workload X's Concurrency is greater than 100" is "true," it may map to the System Condition of RED. In another example, an event of "Monday through Friday between 7 AM and 6 PM" when "true" would map to the Operating Environment Event of OPERATIONAL_QUERIES.

The combination of <RED, OPERATIONAL_QUERIES>, per the corresponding matrix 1100 element 1115, maps to a specific workload management state, which in turn invokes the WVS instance of the workload management ruleset named WVS#21. Unspecified combinations would map to a default System Condition and a default Operating Environment.

Further, a state identified in one element 1115 of the matrix 1100 can be repeated in another element 1115 of the matrix 1100. For example, in FIG. 11, WVS#33 is the chosen workload management rule when the <SysCon, OpEnv> pair is any of: <RED, QUARTERLY_PROCESSING>, <YELLOW, QUARTERLY_PROCESSING> or <RED, END_OF_WEEK_PROCESSING>.

The effect of all this is that the matrix 1100 manages all possible states. In the example of FIG. 11, 12 event combinations comprise $2^{12}$=4096 possible states. However, the 2-dimensional matrix 1100 of FIG. 11, with 3 System Conditions and 4 Operating Environment Events, yields at the most 4×3=12 states, although less than 12 states may be used because of the ability to share states among different <SysCon, OpEnv> pairs in the matrix 1100.

In addition to managing the number of states, the matrix 1100 facilitates conflict resolution through prioritization of its dimensions, such that the system conditions' positions and operating environment events' positions within the matrix 1100 indicate their precedence.

Suppose that more than one condition or event combination were true at any given time. Without the state matrix 1100, a list of 4096 possible states would need to be prioritized by the DBA to determine which workload management rules should be implemented, which would be a daunting task. The matrix 1100 greatly diminishes this challenge through the prioritization of each dimension.

For example, the values of the System Condition dimension are Green, Yellow and Red, wherein Yellow is more severe, or has higher precedence over Green, and Red is more severe or has higher precedence over Yellow as well as Green. If two condition and event combinations were to evaluate as "true" at the same time, one thereby mapping to Yellow and the other mapping to Red, the condition and event combination associated with Red would have precedence over the condition and event combination associated with Yellow.

Consider the following examples. In a first example, there may be a conflict resolution in the System Condition dimension between "Red," which has precedence (e.g., is more "severe") over "Yellow." If a node is down/migrated, then a "Red" System Condition exists. If a dual system is down, then a "Yellow" System Condition exists. If a node is down/migrated and a dual system is down, then the "Red" System Condition has precedence.

In a second example, there may be a conflict resolution in the Operating Environment Event dimension between a "Daily Loads" event, which has precedence over "Operational Queries" events. At 8 AM, the Operating Environment Event may trigger the "Operational Queries" event. However, if loads are running, then the Operating Environment Event may also trigger the "Daily Loads" event. If it is 8 AM and the loads are still running, then the "Daily Loads" Operating Environment Event takes precedence.

Once detected, it is the general case that a condition or event status is remembered (persists) until the status is changed or reset. However, conditions or events may have expiration times, such as for user-defined conditions and events, for situations where the status fails to reset once the condition or event changes. Moreover, conditions or events may have qualification times that require the state be sustained for some period of time, to avoid thrashing situations. Finally, conditions or events may have minimum and maximum duration times to avoid frequent or infrequent state changes.

In summary, the state matrix 1100 of the present invention has a number of advantages. The state matrix 1100 introduces simplicity for the vast majority of user scenarios by preventing an explosion in state handing through a simple, understandable n-dimensional matrix. To maintain this simplicity, best practices will guide the system operator to fewer rather than many SysCon and OpEnv values. It also maintains master control of WVS on the system, but can also support very complex scenarios. In addition, the state matrix can alternatively support an external "enterprise" master through user-defined functions and notifications. Finally, the state matrix 1100 is intended to provide extra dimensions of system management using WD-level rules with a dynamic regulator.

A key point of the matrix 1100 is that by limiting actions to only change SysCon or OpEnv (and not states, or individual rules, or rules' WVs), master control is contained in a single place, and avoids having too many entities asserting control. For example, without this, a user might change the individual weight of one workload to give it highest priority, without understanding the impact this has on other workloads. Another user might change the priority of another workload to be even higher, such that they overwrite the intentions of the first user. Then, the DBS 100 internally might have done yet different things. By funneling all actions to be associated with a SysCon or OpEnv instead of directed to individual rules in the ruleset, or directly to a state as a whole, the present invention avoids what could be chaos in the various events. Consequently, in the present invention, the WVS's are changed as a whole (since some settings must really be made in light of all workloads, not a single workload or other rule), and by changing just SysCon or OpEnv, in combination with precedence, conflict resolution is maintained at the matrix 1100.

The state matrix 1100 may be used by a single regulator 415 controlling a single DBS 100, or a plurality of state matrices 1100 may be used by a plurality of regulators 415 controlling a plurality of DBS 100. Moreover, a single state matrix 1100 may be used with a plurality of regulators 415 controlling a plurality of DBS 100, wherein the single state matrix 1100 is a domain-level state matrix 1100 used by a domain-level "virtual" regulator.

Figure 12:
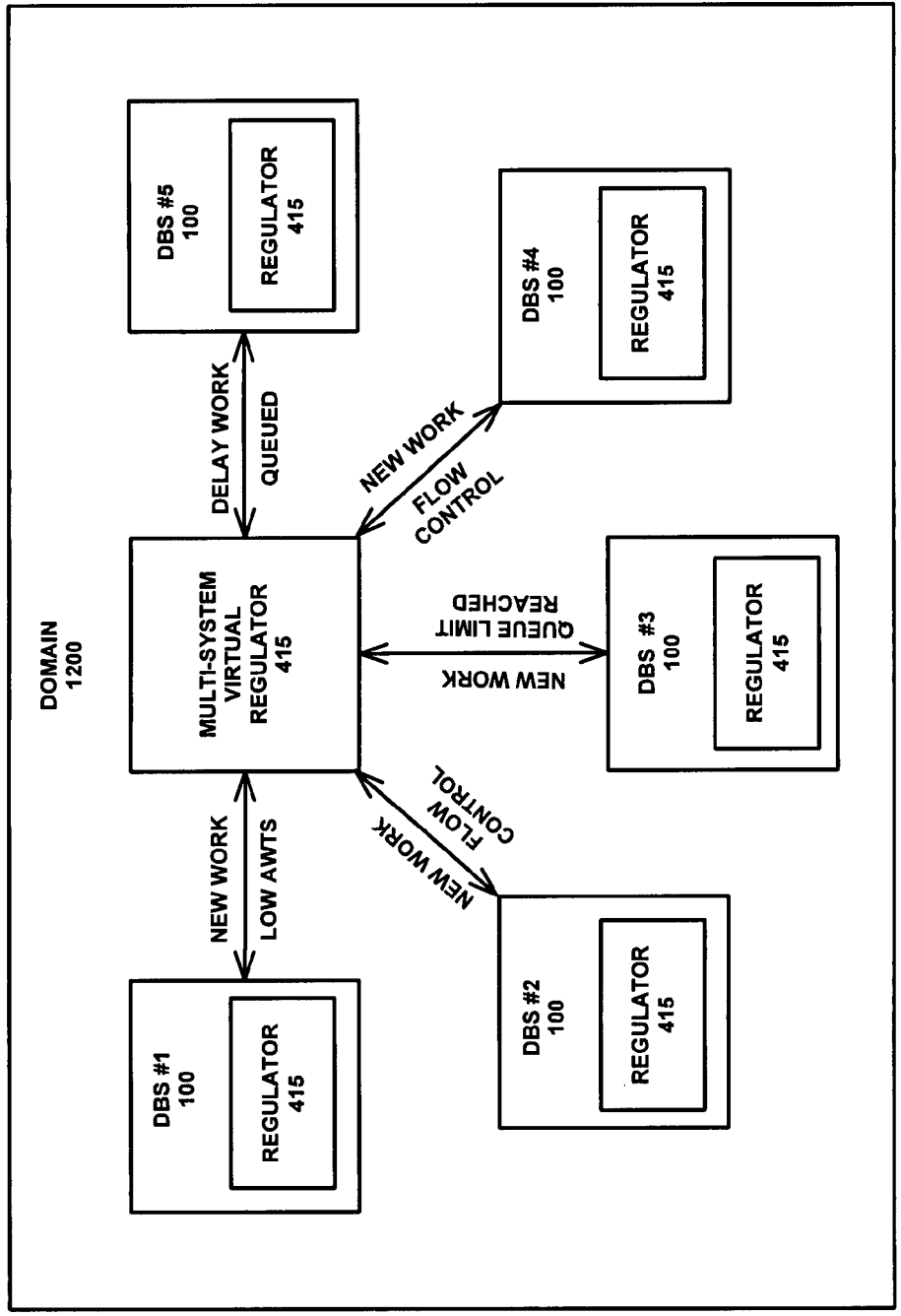
FIG. 12 illustrates a multi-system environment including a domain-level virtual regulator and a plurality of system-level regulators.

FIG. 12 illustrates an embodiment where a plurality of regulators 415 exist in a domain 1200 comprised of a plurality of dual-active DBS 100, wherein each of the dual-active DBS 100 is managed by one or more regulators 415 and the domain 1200 is managed by one or more multi-system "virtual" regulators 415.

Managing system resources on the basis of individual systems and requests does not, in general, satisfactorily manage complex workloads and SLGs across a domain 1200 in a multi-system environment. To automatically achieve workload goals in a multi-system environment, performance goals must first be defined (administered), then managed (regulated), and finally monitored across the entire domain 1200 (set of systems participating in an n-system environment).

Regulators 415 are used to manage workloads on an individual DBS 100 basis. A virtual regulator 415 comprises a modified regulator 415 implemented to enhance the closed-loop system management (CLSM) architecture in a domain 1200. That is, by extending the functionality of the regulator 415 components, complex workloads are manageable across a domain 1200.

The function of the virtual regulator 415 is to control and manage workloads across all DBS 100 in a domain 1200. The functionality of the virtual regulator 415 extends the existing goal-oriented workload management infrastructure, which is capable of managing various types of workloads encountered during processing.

In one embodiment, the virtual regulator 415 includes a "thin" version of a DBS 100, where the "thin" DBS 100 is a DBS 100 executing in an emulation mode, such as described in U.S. Pat. Nos. 6,738,756, 7,155,428, 6,801,903 and 7,089,258, all of which are incorporated by reference herein. A query optimizer function 320 of the "thin" DBS 100 allows the virtual regulator 415 to classify received queries into "who, what, where" classification criteria, and allows a workload query manager 610 of the "thin" DBS 100 to perform the actual routing of the queries among multiple DBS 100 in the domain 1200. In addition, the use of the "thin" DBS 100 in the virtual regulator 415 provides a scalable architecture, open application programming interfaces (APIs), external stored procedures (XSPs), user defined functions (UDFs), message queuing, logging capabilities, rules engines, etc.

The virtual regulator 415 also includes a set of open APIs, known as "Traffic Cop" APIs, that provide the virtual regulator 415 with the ability to monitor DBS 100 states, to obtain DBS 100 status and conditions, to activate inactive DBS 100, to deactivate active DBS 100, to set workload groups, to delay queries (i.e., to control or throttle throughput), to reject queries (i.e., to filter queries), to summarize data and statistics, to create DBQL log entries, run a program (stored procedures, external stored procedures, UDFs, etc.), to send messages to queue tables (Push, Pop Queues), and to create dynamic operating rules. The Traffic Cop APIs are also made available to all of the regulators 415 for each DBS 100, thereby allowing the regulators 415 for each DBS 100 and the virtual regulator 415 for the domain 1200 to communicate this information between themselves.

Specifically, the virtual regulator 415 performs the following functions: (a) Regulate (adjust) system conditions (resources, settings, PSF weights, etc.) against workload expectations (SLGs) across the domain 1200, and to direct query traffic to any of the DBS 100 via a set of predefined rules. (b) Monitor and manage system conditions across the domain 1200, including adjusting or regulating response time requirements by DBS 100, as well as using the Traffic Cop APIs to handle filter, throttle and/or dynamic allocation of resource weights within DBS 100 and partitions so as to meet SLGs across the domain 1200. (c) Raise an alert to a DBA for manual handling (e.g., defer or execute query, recommendation, etc.) (d) Cross-compare workload response time histories (via a query log) with workload SLGs across the domain 1200 to determine if query gating (i.e., flow control) through altered Traffic Cop API settings presents feasible opportunities for the workload. (e) Manage and monitor the regulators 415 across the domain 1200 using the Traffic Cop APIs, so as to avoid missing SLGs on currently executing workloads, or to allow workloads to execute the queries while missing SLGs by some predefined or proportional percentage based on shortage of resources (i.e., based on predefined rules). (f) Route queries (traffic) to one or more available DBS 100.

Although FIG. 12 depicts an implementation using a single virtual regulator 415 for the entire domain 1200, in some exemplary environments, one or more backup virtual regulators 415 are also provided for circumstances where the primary virtual regulator 415 malfunctions or is otherwise unavailable. Such backup virtual regulators 415 may be active at all times or may remain dormant until needed.

In some embodiments, each regulator 415 communicates its system conditions and operating environment events directly to the virtual regulator 415. The virtual regulator 415 compiles the information, adds domain 1200 or additional system level information, to the extent there is any, and makes its adjustments based on the resulting set of information.

In other embodiments, each regulator 415 may have superordinate and/or subordinate regulators 415. In such embodiments, each regulator 415 gathers information related to its own system conditions and operating environment events, as well as that of its children regulators 415, and reports the aggregated information to its parent regulator 415 or the virtual regulator 415 at the highest level of the domain 1200.

When the virtual regulator 415 compiles its information with that which is reported by all of the regulators 415, it will have complete information for domain 1200. The virtual regulator 415 analyzes the aggregated information to apply rules and make adjustments.

The virtual regulator 415 receives information concerning the states, events and conditions from the regulators 415, and compares these states, events and conditions to the SLGs. In response, the virtual regulator 415 adjusts the operational characteristics of the various DBS 100 through the set of "Traffic Cop" Open APIs to better address the states, events and conditions of the DBS 100 throughout the domain 1200.

Generally speaking, regulators 415 provide real-time closed-loop system management over resources within the DBS 100, with the loop having a fairly narrow bandwidth, typically on the order of milliseconds, seconds, or minutes. The virtual regulator 415, on the other hand, provides real-time closed-loop system management over resources within the domain 1200, with the loop having a much larger bandwidth, typically on the order of minutes, hours, or days.

Further, while the regulators 415 control resources within the DBS's 100, and the virtual regulator 415 controls resources across the domain 1200, in many cases, DBS 100 resources and domain 1200 resources are the same. The virtual regulator 415 has a higher level view of resources within the domain 1200, because it is aware of the state of resources of all DBS 100, while each regulator 415 is generally only aware of the state of resources within its own DBS 100.

There are a number of techniques by which virtual regulator 415 implements its adjustments to the allocation of system resources. For example, and as illustrated in FIG. 12, the virtual regulator 415 communicates adjustments directly to the regulators 415 for each DBS 100, and the regulators 415 for each DBS 100 then apply the relevant rule adjustments. Alternatively, the virtual regulator 415 communicates adjustments to the regulators 415 for each DBS 100, which then passes them on to other, e.g., subordinate, regulators 415 in other DBS 100. In either case, the regulators 415 in each DBS 100 incorporate adjustments communicated by the virtual regulator 415.

Given that the virtual regulator 415 has access to the state, event and condition information from all DBS 100, it can make adjustments that are mindful of meeting SLGs for various workload groups. It is capable of, for example, adjusting the resources allocated to a particular workload group on a domain 1200 basis, to make sure that the SLGs for that workload group are met. It is further able to identify bottlenecks in performance and allocate resources to alleviate the bottlenecks. Also, it selectively deprives resources from a workload group that is idling resources. In general, the virtual regulator 415 provides a domain 415 view of workload administration, while the regulators 415 in each DBS 100 provide a system view of workload administration.

The present invention also provides for dynamic query optimization between DBS 100 in the domain 1200 based on system conditions and operating environment events. In the domain 1200, the DBS 100 to which a query will be routed can be chosen by the virtual regulator 415; in a single DBS 100, there is no choice and the associated regulator 415 for that DBS 100 routes only within that DBS 100.

This element of choice can be leveraged to make intelligent decisions regarding query routing that are based on the dynamic state of the constituent DBS 100 within the domain 1200. Routing can be based any system conditions or operating environment events that are viewed as pertinent to workload management and query routing. This solution thus leverages and provides a runtime resource sensitive and data driven optimization of query execution.

In one embodiment, the system conditions or operating environment events may comprise:
  Performance conditions, such as:
    Flow control,
    AWT exhaustion, or
    Low memory.
  Availability indicators, such as:
    Performance continuity situation,
    System health indicator,
    Degraded disk devices,
    Degraded controllers,
    Node, parsing engine (PE), access module processor (AMP), gateway (GTW) or interconnect (BYNET) down,
    Running in fallback.
  Resource utilization (the optimizer 320 bias can be set to favor plans that will use less of the busy resources), such as:
    Balanced,
    CPU intensive or under-utilized,
    Disk I/O intensive or under-utilized, or
    File system intensive or under-utilized.
  User or DBA defined conditions or events, or user-defined events.
  Time periods (calendar).

Routing can be based on combinations of the system conditions and operating environment events described above. As noted in the state matrix 1100, associated with each condition, event or combination of conditions and events can be a WVS instance of a workload management ruleset. Some of the possible rules are:
  Do not route to system X under this condition, event or combination of conditions and events.
  Increase optimizer 320 run time estimate for system X by Y % of prior to routing decision.
  Use optimizer 320 bias factors to determine optimizer 320 estimates prior to routing decision.
  Decrease load on system X by routing only Y % of queries that would normally be routed to system X.

Thus, the present invention adds to the value proposition of a multi-system environment by leveraging query routing choices and making intelligent choices of query routing based on system conditions and operating environment events.

The present invention also provides for dynamic query and step routing between systems 100 tuned for different objectives. Consider that a data warehouse system 100 may be tuned to perform well on a particular workload, but that same tuning may not be optimal for another workload. In a single system 100, tuning choices must be made that trade-off the performance of multiple workloads. Example workloads would include batch loading, high volume SQL oriented inserts/updates, decision support and tactical queries.

The present invention also provides a solution that allows a domain 1200 to be tuned for multiple objectives with few or lesser trade-offs. Specifically, the present invention enables tuning of each constituent system/DBS 100 (within a domain 1200) differently and routes queries or steps of queries to systems 100 based on cost estimates of the more efficient system/DBS 100. In the case of per step routing, step crossovers between systems 100 (the cost of a first step performed on a first system 100 and a second step performed on a second system 100) are also costed, in order determine a low cost plan.

The following table provides an example of possible tuning parameters:

| Parameter | Optimized for Decision Support Systems (DSS) | Optimized for tactical queries in an ADW |
|---|---|---|
| Data Block Size | Large - Fetch more rows per access | Small - Avoid fetching/or caching unneeded rows |
| Cylinder Read Buffers | Many - effectively makes a random workload pseudo-sequential | Few - Disruptive to tactical query SLGs - Memory use |
| Memory for Cache | Small to Medium - Cost reduction - Scanned data cache unfriendly | Large - increase hit rate |
| Disk Size | Larger - Pseudo-sequential scan rate allows good performance for DSS - Capacity and cost reduction | Smaller - To achieve good performance for ADW/Capacity |
| Read-ahead | Read ahead many to generate as much workload as possible for the IO subsystem, since it can optimize performance when there are more IOs queued for service | No read-ahead or read-ahead few to avoid having uncontrolled DSS workload over consume IOs and impact tactical query performance |

The present invention uses cost functions of each system 100 to determine routing. Moreover, cost coefficients for each system 100 are a function of the tuning (for example, block size). Finally, the decision to route can be based on which system 100 can meet the SLG.

As used herein, a cost or cost function provides an estimate of how many times rows must be moved in or out of AMPs (within a system 100). Such movement includes row read, row writes, or AMP-AMP row transfers. The purpose of a cost analysis is not to unerringly choose the "best" strategy. Rather, if there is a clearly best strategy, it is desirable to find and route a function to a system 100 tuned for such a strategy. Similarly, if there is clearly a worst strategy, it is desirable to avoid a system 100 tuned for such a strategy. Since each system 100 may be tuned differently, the cost function may be utilized to determine which system 100 should be used for a particular query or query step.

Cost-based query optimizers typically consider a large number of candidate plans, and select one for execution. The choice of an execution plan is the result of various interacting factors, such as a database and system state, current table statistics, calibration of costing formulas, algorithms to generate alternatives of interest, heuristics (e.g., greedy algorithms) to cope with combinatorial explosion of the search space, cardinalities, etc. In addition, a cost model can be used to estimate the response time of a given query plan and search the space (e.g., state space or the differently tuned systems 100) of query plans in some fashion to return a plan (that utilizes one or more systems 100) with a low (minimum), value of cost. For example, a cost function may compute a cost value for a query plan that is for instance the time needed to execute the plan, the goal of optimization is to generate the query plan with the lowest cost value. To achieve efficiency, cost models estimate the response time for the variously tuned systems using approximation functions. Thus, the different method/systems 100 response times for performing a unit of work are compared and the most efficient (system or systems) is selected.

As a result, the present invention enables new efficiencies in a domain 1200 comprising a multi-system environment that are not possible within a single DBS 100. In a single DBS 100, a tuning parameter must be in a single state, and cannot be in multiple states, which often causes a trade-off between conflicting objectives. However, with a multi-system environment, the trade-offs inherent in tuning a single system 100 are not present. Major differences in tuning and configuration are possible between the constituent systems 100. When combined with the ability to intelligently route a workload between the systems 100, this invention opens up new solutions to data warehouse problems.

In addition to routing a workload to particularly tuned systems, some workloads may still not perform optimally due to the limited availability of resources. As described above, data maintenance tasks in a DBS 100 are typically competitors for limited resources and often are overlooked. Typically, these tasks run in the background or are relegated to a low system priority as indicated in the states matrix 1100. However, in some cases, performing these data maintenance tasks may actually free up more resources than they consume. For example, this is true in the case of gathering up-to-date statistics, which may lead to more efficient optimizer plans. In other examples, data maintenance tasks may provide other rewards in terms of space savings, compaction, data integrity, etc. In a multi-system environment of the invention (e.g., a domain 1200), some data maintenance tasks may be performed on one system 100 and the results applied to some or all of the others systems 100. Such data maintenance provides the ability to conduct capacity planning of data warehouse systems 100.

One or more embodiments of the invention provide a mechanism for virtual data maintenance in the DBS 100. In this regard, some types of data maintenance tasks may be performed virtually on a replicated copy of the data. Only certain tasks may be suitable for this remote virtualization, including the following:

Collecting statistics,
Collecting demographics,
Compression analysis,
Checking referential integrity,
Space accounting,
Index analysis/wizard, and
Statistics analysis/wizard.
Scanning Disks (Scan Disk)
Rebuilding Tables (Table Rebuild)
Etc.

However, other tasks, must be run in-situ on the system to which they apply (for example, checking the integrity of the file system), and thus may not be applicable to the present invention.

The present invention includes the ability to route certain data maintenance tasks for service on one or more designated DBS 100 within a domain 1200 (i.e., multi-system environment). In other words, if that data maintenance task is invoked on one DBS 100, the request can be detected and sent to another DBS 100 for execution. Each of the above identified tasks are described in more detail below.

Collecting statistics or demographics can be an I/O and CPU intensive activity that can yield more efficient plans, but which is often neglected because of the impact it might cause on a production DBS 100 in terms throughput due to resource use and response time. Some statistics are global and are always eligible for virtualization to a different DBS 100 in a domain 1200. Other statistics are kept on per AMP basis and are eligible for virtualization on a different DBS 100 as long as the number of AMPs is identical.

Furthermore, through export of a hash map from one DBS 100 to another DBS 100, the present invention includes the ability to calculate per AMP statistics virtually from a DBS 100 with a different number of AMPs than the target DBS 100. In this regard, a hash map (and hash function) is used in a partitioning scheme to assign records to AMPs (wherein the hashing function generates a hash "bucket" number and the hash bucket numbers are mapped to AMPs). Such partitioning is used to enhance parallel processing across multiple AMPs (by dividing a query or other unit of work into smaller sub-units, each of which can be assigned to an AMP). Thus, the hash map that is used to assign records to a particular AMP provides the ability to gather statistics regarding how often a particular AMP will be assigned a workload. Such knowledge is useful in determining an optimal and efficient plan.

Space accounting data maintenance can be performed virtually when the number of parallel units on two DBS's 100 is identical and all objects are replicated. In this case, the normal background tasks of recalculating space usage may be virtualized and remoted from one DBS 100 to another DBS 100.

Compression analysis involves the examination of data for frequency of use of each value in each column domain. This analysis is independent of the number of parallel units in a data warehouse system 100 and therefore may be virtualized and exported to any DBS 100 in a domain 1200 containing a replicated copy of a relational table. The results of the compression analysis are applicable to all replicated copies of the data and may be used to instantiate value compression on each DBS 100 in the domain 1200.

Integrity checking is often performed at multiple levels, some of which are suitable for virtualization and execution on a different DBS 100 in a domain 1200. In the Teradata RDBMS product (e.g., an ADW), one such integrity checking utility is "Check Table." "Check Table" is a utility that compares primary and fallback copies of redundant data and reports any discrepancies. Virtualized remote execution of a replica of some or all of a DBS 100 can accomplish some of the data integrity objectives. One may also use a data integrity checking utility to support options for virtualized checking versus in situ testing such that overlap is minimized. In this way, the maximum value can be gained form virtual remote execution of the integrity check.

Index analysis is often recommended to identify opportunities for improved indexes for a workload. A number of techniques may be employed for index analysis. One example is the Teradata Index Wizard™ that automates the selection of Secondary indices (NUSI [non-unique secondary index], USIs [unique secondary index], and VOSIs [value ordered secondary index]), Primary Partition Indices (PPI), Join Indices (JIs) and Covered Indices for a given workload. Through the use of a Teradata System Emulation Tool (TSET) of the invention, the DBS 100 cost parameters may be emulated on another system 100 in a domain 1200 and the index analysis can be virtualized for remote execution.

Statistics analysis is often recommended to identify opportunities for improved statistics collection. A number of new techniques may be employed for statistics analysis—one example is through the use of TSET in accordance with embodiments of the invention. For example, table level statistics can easily be shared from one DBS 100 to another DBS 100 in a domain 1200. The statistics analysis can easily be virtualized for remote execution.

The present invention thus enables the use of another DBS 100 to execute various data maintenance tasks virtually on behalf of DBS's 100 where it is undesirable to execute those same data maintenance tasks. By virtualizing these data maintenance tasks, they may execute on DBS's 100 more desirable for those tasks. The present invention enables new forms of coexistence and new options for capacity planning, whereby dedication of specific resources for data maintenance tasks may be a more cost effective or performance solution than running those same tasks on the DBS's 100 servicing the bulk of the workload.

Figure 13:
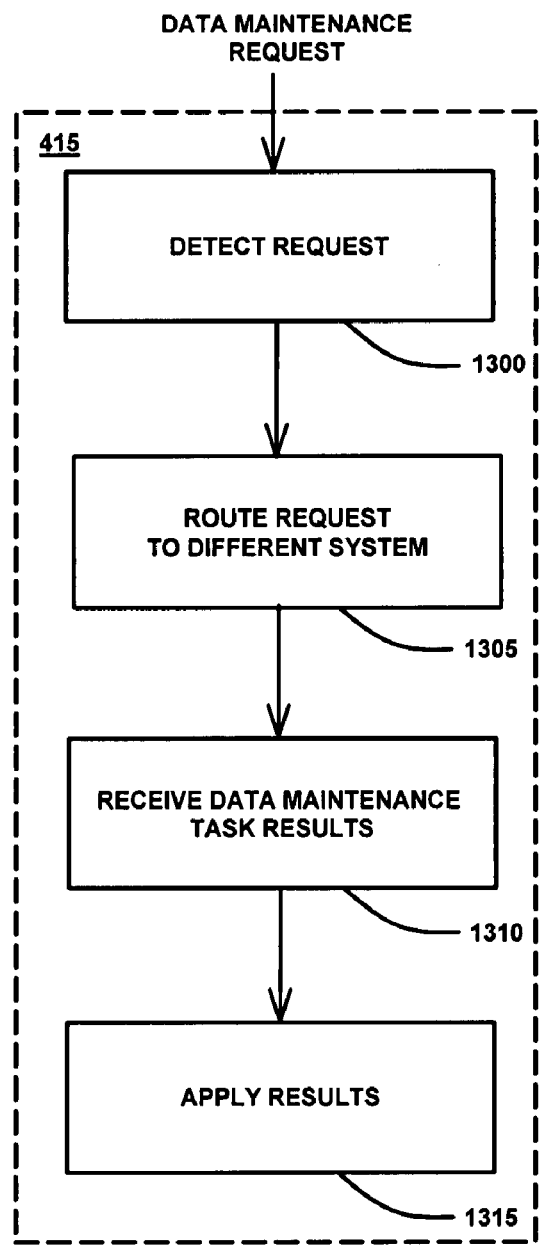
FIG. 13 is a flow chart illustrating a method for performing data maintenance tasks in a data warehouse system in accordance with one or more embodiments of the invention.

FIG. 13 is a flow chart illustrating a method for performing data maintenance tasks in a domain 1200 in accordance with one or more embodiments of the invention. As illustrated, a data maintenance request for service on one or more designated DBS's 100 in the domain 1200 is invoked. The virtual regulator 415 detects the request at step 1300. The regulator 415 routes the request to a different DBS 100 at step 1305. At step 1310, the results of the data maintenance operation is received in the virtual regulator 415 (i.e., from the different DBS 100). At step 1315, the results of the operation are applied to the originally designated DBS's 100.

Thus, as illustrated in FIG. 13, the data maintenance task is invoked on one DBS 100, detected by the virtual regulator 415, and the task is sent to another DBS 100 in the domain 1200 for execution. The routing of such data maintenance tasks to different DBS 100 in the domain 1200 allows more desirable DBS's 100 to execute data maintenance tasks thereby freeing up resources, allowing more efficient optimizer plans, saving space, and/or improving data integrity.

In conclusion, while specific embodiments of a broader invention have been described herein, the present invention may also be carried out in a variety of alternative embodiments and thus is not limited to those described here. For example, while the invention has been described here in terms of a DBS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A computer-implemented apparatus for performing data maintenance tasks in a data warehouse system, comprising:
    (a) a domain comprised of a plurality of database systems that are tuned for different objectives and particular workloads, wherein each of the plurality of database systems includes a closed-loop system management (CLSM) regulator, performed by a processor, for monitoring and managing its database system and for controlling resources within its database system, such that each CLSM regulator aggregates information related to its database system as well as that of its children CLSM regulators, and reports the aggregated information to its parent CLSM regulator; and
    (b) a virtual regulator, performed by a processor and comprising a CLSM regulator at a highest level of the domain, that communicates with the CLSM regulators that manage the plurality of database systems, for monitoring and managing the domain and for controlling resources within the domain across the plurality of database systems, such that the virtual regulator compiles the aggregated information reported by the CLSM regulators in order to apply rules that adjust operational characteristics of the plurality of database systems and that adjust resources allocated to workloads performed by the plurality of database systems, in order to make sure that service level goals (SLGs) for the workloads are met;
    (c) wherein the virtual regulator automatically:
        (i) routes a workload to a first database system of the plurality of database systems, based on how the plurality of database systems are tuned for different objectives and particular workloads, as well as the aggregated information compiled by the virtual regulator, for workload management and resource optimization;
        (ii) detects a request to perform a data maintenance task on data stored on the first database system of the plurality of database systems;
        (iii) determines from how the plurality of database systems are tuned for different objectives and particular workloads, as well as the aggregated information compiled by the virtual regulator, that it is undesirable to perform the data maintenance task on the data stored on the first database system, due to limited availability of resources;
        (iv) routes the data maintenance task to a second database system of the plurality of database systems for execution, when it is determined from how the plurality of database systems are tuned for different objectives and particular workloads, as well as the aggregated information compiled by the virtual regulator, that it is undesirable to perform the data maintenance task on the data stored on the first database system due to limited availability of resources, so that the data maintenance task is performed virtually on a replicated copy of the data stored on the second database system; and
        (v) applies results from the data maintenance task performed by the second database system to the first database system, thereby freeing up resources, enhancing parallel processing across the plurality of database systems, and providing cost effective dedication of specific resources for the data maintenance task.

2. The apparatus of claim 1, wherein the data maintenance task comprises collecting statistics or demographics.

3. The apparatus of claim 2, wherein the statistics are maintained on a per access module processor (AMP) basis and the number of AMPs in each database system is identical.

4. The apparatus of claim 2, wherein through export of a hash map, the statistics are maintained on a per access module processor (AMP) basis and the number of AMPs in each database system is different.

5. The apparatus of claim 1, wherein the data maintenance task comprises space accounting.

6. The apparatus of claim 1, wherein:
    the data maintenance task comprises compression analysis wherein data is examined for frequency of use of each value in each column domain; and
    the results are applied by instantiating value compression on the first database system.

7. The apparatus of claim 1, wherein the data maintenance task comprises integrity checking of the data.

8. The apparatus of claim 1, wherein the data maintenance task comprises index analysis to identify opportunities for improved indexes for a workload.

9. The apparatus of claim 1, wherein the data maintenance task comprises statistics analysis to identify opportunities for improved statistics collection.

10. A computer-implemented method for performing data maintenance tasks in a data warehouse system, comprising:
(a) providing a domain comprised of a plurality of database systems that are tuned for different objectives and particular workloads;
(b) wherein each of the plurality of database systems includes a closed-loop system management (CLSM) regulator performed by a processor for monitoring and managing its database system and for controlling resources within its database system, such that each CLSM regulator aggregates information related to its database system as well as that of its children CLSM regulators, and reports the aggregated information to its parent CLSM regulator;
(c) wherein a virtual regulator, performed by a processor and comprising a CLSM regulator at a highest level of the domain, communicates with the CLSM regulators that manage the plurality of database systems, for monitoring and managing the domain and for controlling resources within the domain across the plurality of database systems, such that the virtual regulator compiles the aggregated information reported by the CLSM regulators in order to apply rules that adjust operational characteristics of the plurality of database systems and that adjust resources allocated to workloads performed by the plurality of database systems, in order to make sure that service level goals (SLGs) for the workloads are met;
(d) wherein the virtual regulator automatically performs the steps of:
(i) routing a workload to a first database system of the plurality of database systems, based on how the plurality of database systems are tuned for different objectives and particular workloads, as well as the aggregated information compiled by the virtual regulator, for workload management and resource optimization;
(ii) detecting a request to perform a data maintenance task on data stored on the first database system of the plurality of database systems;
(iii) determining from how the plurality of database systems are tuned for different objectives and particular workloads, as well as the aggregated information compiled by the virtual regulator, that it is undesirable to perform the data maintenance task on the data stored on the first database system, due to limited availability of resources;
(iv) routing the data maintenance task to a second database system of the plurality of database systems for execution, when it is determined from how the plurality of database systems are tuned for different objectives and particular workloads, as well as the aggregated information compiled by the virtual regulator, that it is undesirable to execute the data maintenance task on the first database system, so that the data maintenance task is performed virtually on a replicated copy of the data stored on the second database system; and
(v) applying results from the data maintenance task executed by the second database system to the first database system, thereby freeing up resources, enhancing parallel processing across the plurality of database systems, and providing cost effective dedication of specific resources for the data maintenance task.

11. The method of claim 10, wherein the data maintenance task comprises collecting statistics or demographics.

12. The method of claim 11, wherein the statistics are maintained on a per access module processor (AMP) basis and the number of AMPs in each database system is identical.

13. The method of claim 11, wherein through export of a hash map, the statistics are maintained on a per access module processor (AMP) basis and the number of AMPs in each database system is different.

14. The method of claim 10, wherein the data maintenance task comprises space accounting.

15. The method of claim 10, wherein:
the data maintenance task comprises compression analysis wherein data is examined for frequency of use of each value in each column domain; and
the results are applied by instantiating value compression on the first database system.

16. The method of claim 10, wherein the data maintenance task comprises integrity checking of the data.

17. The method of claim 10, wherein the data maintenance task comprises index analysis to identify opportunities for improved indexes for a workload.

18. The method of claim 10, wherein the data maintenance task comprises statistics analysis to identify opportunities for improved statistics collection.

19. An article of manufacture comprising one or more storage devices tangibly embodying instructions that, when executed by one or more computer systems, result in the computer systems performing a method for performing data maintenance tasks in a data warehouse system, the method comprising:
(a) providing a domain comprised of a plurality of database systems that are tuned for different objectives and particular workloads;
(b) wherein each of the plurality of database systems includes a closed-loop system management (CLSM) regulator performed by a processor for monitoring and managing its database system and for controlling resources within its database system, such that each CLSM regulator aggregates information related to its database system as well as that of its children CLSM regulators, and reports the aggregated information to its parent CLSM regulator;
(c) wherein a virtual regulator, performed by a processor and comprising a CLSM regulator at a highest level of the domain, communicates with the CLSM regulators that manage the plurality of database systems, for monitoring and managing the domain and for controlling resources within the domain across the plurality of database systems, such that the virtual regulator compiles the aggregated information reported by the CLSM regulators in order to apply rules that adjust operational characteristics of the plurality of database systems and that adjust resources allocated to workloads performed by the plurality of database systems, in order to make sure that service level goals (SLGs) for the workloads are met;
(d) wherein the virtual regulator automatically:
(i) routes a workload to a first database system of the plurality of database systems, based on how the plurality of database systems are tuned for different objectives and particular workloads, as well as the aggregated information compiled by the virtual regulator, for workload management and resource optimization;

(ii) detects a request to perform a data maintenance task on data stored on the first database system of the plurality of database systems;

(iii) determines from how the plurality of database systems are tuned for different objectives and particular workloads, as well as the aggregated information compiled by the virtual regulator, that it is undesirable to perform the data maintenance task on the data stored on the first database system, due to limited availability of resources;

(iv) routes the data maintenance task to a second database system of the plurality of database systems for execution, when it is determined from how the plurality of database systems are tuned for different objectives and particular workloads, as well as the aggregated information compiled by the virtual regulator, that it is undesirable to perform the data maintenance task on the data stored on the first database system due to limited availability of resources, so that the data maintenance task is performed virtually on a replicated copy of the data stored on the second database system; and (v) applies results from the data maintenance task performed by the second database system to the first database system, thereby freeing up resources, enhancing parallel processing across the plurality of database systems, and providing cost effective dedication of specific resources for the data maintenance task.

20. The article of claim 19, wherein the data maintenance task comprises collecting statistics or demographics.

21. The article of claim 19, wherein the data maintenance task comprises space accounting.

22. The article of claim 19, wherein:
the data maintenance task comprises compression analysis wherein data is examined for frequency of use of each value in each column domain; and
the results are applied by instantiating value compression on the first database system.

23. The article of claim 19, wherein the data maintenance task comprises integrity checking of the data.

24. The article of claim 19, wherein the data maintenance task comprises index analysis to identify opportunities for improved indexes for a workload.

25. The article of claim 19, wherein the data maintenance task comprises statistics analysis to identify opportunities for improved statistics collection.

* * * * *

UNITED STATES PATENT AND TRADEMARK OFFICE
CERTIFICATE OF CORRECTION

PATENT NO. : 8,392,461 B2
APPLICATION NO. : 11/985909
DATED : March 5, 2013
INVENTOR(S) : Douglas Brown et al.

It is certified that error appears in the above-identified patent and that said Letters Patent is hereby corrected as shown below:

Title Page, Item (73)
Assignee: "Teradota US, Inc."
Should read -- Teradata US, Inc. --

Signed and Sealed this
Ninth Day of April, 2013

Teresa Stanek Rea
*Acting Director of the United States Patent and Trademark Office*